United States Patent
Kuroda et al.

(10) Patent No.: US 7,577,065 B2
(45) Date of Patent: Aug. 18, 2009

(54) INFORMATION RECORDING DEVICE AND METHOD, AND COMPUTER PROGRAM

(75) Inventors: Kazuo Kuroda, Tokorozawa (JP); Eiji Muramatsu, Tokorozawa (JP); Masahiro Kato, Tokorozawa (JP); Kunihiko Horikawa, Tokorozawa (JP); Shoji Taniguchi, Tokorozawa (JP); Toshio Suzuki, Tokorozawa (JP)

(73) Assignee: Pioneer Corporation, Tokyo (JP)

( * ) Notice: Subject to any disclaimer, the term of this patent is extended or adjusted under 35 U.S.C. 154(b) by 488 days.

(21) Appl. No.: 10/577,773

(22) PCT Filed: Oct. 27, 2004

(86) PCT No.: PCT/JP2004/015942

§ 371 (c)(1),
(2), (4) Date: Apr. 28, 2006

(87) PCT Pub. No.: WO2005/043534

PCT Pub. Date: May 12, 2005

(65) Prior Publication Data

US 2007/0030773 A1 Feb. 8, 2007

(30) Foreign Application Priority Data

Oct. 30, 2003 (JP) ............................. 2003-370692

(51) Int. Cl.
*G11B 7/00* (2006.01)

(52) U.S. Cl. ................ 369/47.3; 369/53.15; 369/47.33; 369/53.28

(58) Field of Classification Search ............... 369/30.12, 369/47.14, 47.44, 53.15–53.17, 44.27, 44.31–44.33, 369/53.12, 53.2, 53.24, 53.32
See application file for complete search history.

(56) References Cited

U.S. PATENT DOCUMENTS 5,748,590 A * 5/1998 Iwasaki et al. ........... 369/53.15
6,678,236 B1 * 1/2004 Ueki ........................ 369/275.3

FOREIGN PATENT DOCUMENTS

| JP | 6-52635 | 2/1994 |
| JP | 2000-9955 | 1/2000 |
| JP | 2000-149463 | 5/2000 |
| JP | 2000-298950 | 10/2000 |
| JP | 2001-14812 | 1/2001 |
| JP | 2002-260232 | 9/2002 |
| JP | 2002-279649 | 9/2002 |

* cited by examiner

*Primary Examiner*—Wayne R Young
*Assistant Examiner*—Brian Butcher
(74) *Attorney, Agent, or Firm*—Young & Thompson

(57) ABSTRACT

An information recording apparatus is provided with: a recording device for recording information onto an information recording medium; a detrack detecting device for detecting occurrence of detrack during the recording of the information; and a controlling device for controlling the recording device to return to a location where the detrack has occurred and restart the recording if the occurrence of the detrack is detected.

10 Claims, 13 Drawing Sheets

Stop overwriting & writing — Detrack occurs

Stop overwriting & writing — Detrack occurs

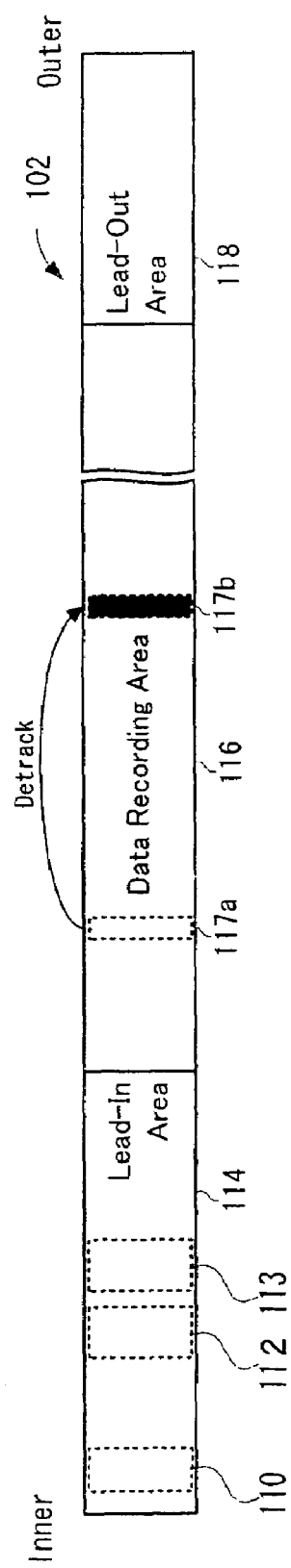
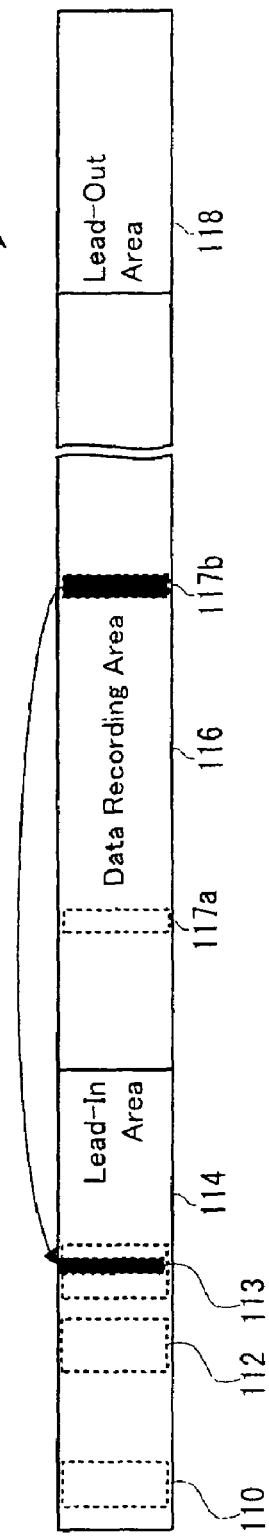
FIG. 10(a)
FIG. 10(b)

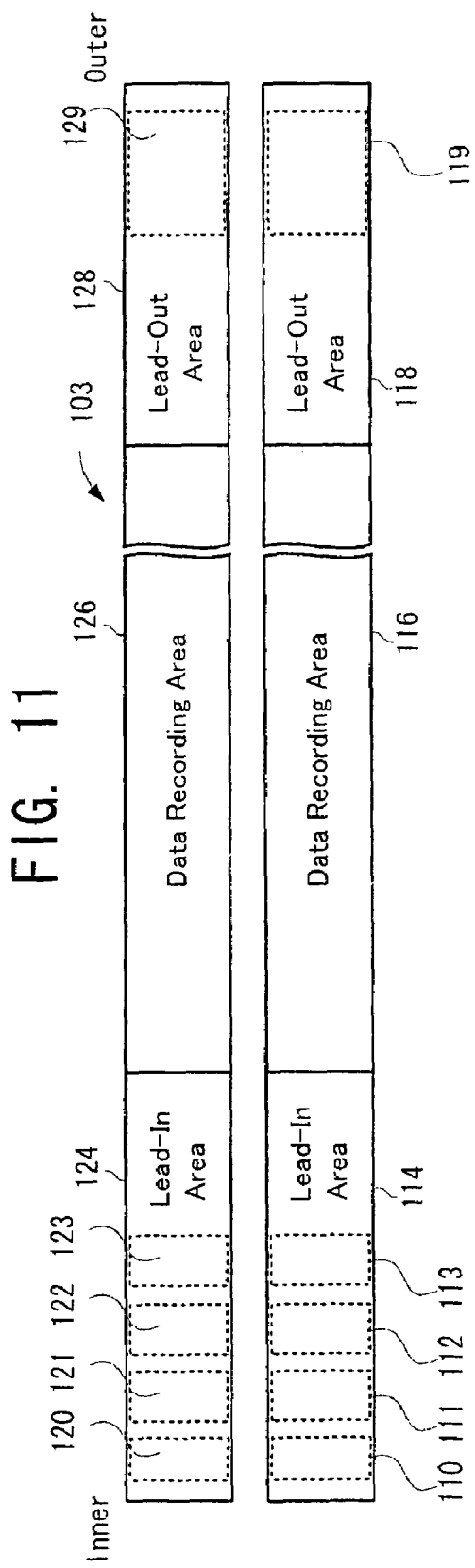

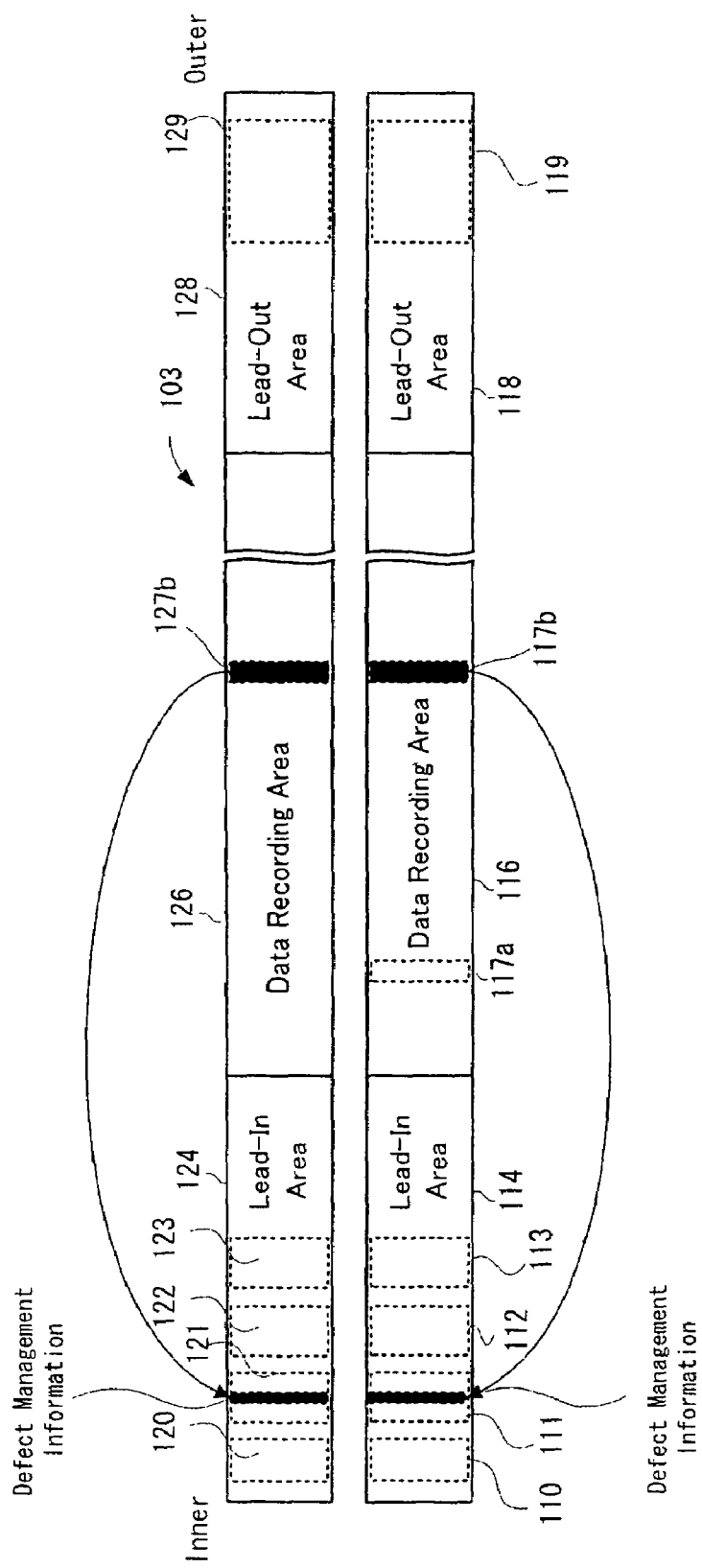

INFORMATION RECORDING DEVICE AND METHOD, AND COMPUTER PROGRAM

TECHNICAL FIELD

The present invention relates to an information recording apparatus, such as a DVD recorder, an information recording method, and a computer program which makes a computer function as the information recording apparatus.

BACKGROUND ART

Optical discs, such as a CD (Compact Disc) and a DVD, are popularized. With respect to these optical discs, information is recorded onto the optical discs or the recorded information is read, by a laser irradiated from an optical pickup. Then, the recording operation and the reproduction operation at this time are performed by that the optical pickup is displaced along a track which is formed in a spiral shape on the optical disc, for example. Moreover, the laser irradiated from the optical pickup is focused on an information pit formed on the track, to thereby read the information content that is indicated by the information pit.

On the other hand, in some cases, there arises that the laser irradiated from the optical pickup is out of focus, i.e. defocus, during the recording or reproduction operation. Such defocus is not preferable from the viewpoint of appropriate information recording and reproduction. In particular, in the case of a multilayer type optical disc having multiple recording layers, there is such a disadvantage that the information is recorded into a recording layer which is different from a recording layer to be recorded originally. Or there is such a disadvantage that the information in a recording layer which is different from a recording layer to be reproduced originally is reproduced, or the like. In this case, there has been developed a technology in which the defocus is detected, for example, and improper jump between recording layers caused by the defocus and the direction of the improper jump are detected, thereby the recovery from the defocus is achieved.

Patent document 1: Japanese Patent Application Laying Open NO. 2000-09955

DISCLOSURE OF INVENTION

Object to be Solved by the Invention

On the other hand, in the case of not only the defocus but alto an optical disc having a single recording layer, for example, it can be considered that the optical pickup is displaced to a position away from a track to be recorded originally, upon the recording. In other words, it can be considered that detrack occurs during the recording. However, in the above-mentioned patent document 1, there is such a technical problem that even if the defocus may be able to being detected on the information recording medium having the plurality of recording layers, it is difficult or impossible to detect such detrack.

Moreover, upon the occurrence of the detrack (or defocus), since the recording operation is continued after the detrack, the information is possibly recorded into a position different from a position to be recorded originally, or the information is possibly recorded (i.e. overwritten) into a position where predetermined information is already recorded due to the detrack. At this time, in the optical disc in which the detrack has occurred, there is a significant error, such as that misinformation or incorrect information which cannot be reproduced is recorded and that proper information which was recorded in the past is also damaged, and the optical disc is treated as a defective disc which cannot be used subsequently. In other words, it is treated as a disc in which not only the subsequent recording of the information but also the reproduction of the information cannot be performed, because of incorrect recording. Therefore, there is such a technical problem that although the incorrect recording occurs in a very small area, as viewed from the entire disc, the entire disc cannot be used.

In order to solve the above-mentioned conventional problem, it is therefore an object of the present invention to provide an information recording apparatus and an information recording method, which enable information to be recorded stably, regardless of the occurrence of the detrack during the recording of the information, as well as a computer program which makes a computer function as the information recording apparatus.

Means for Solving the Object

The above object of the present invention can be achieved by an information recording apparatus provided with: a recording device for recording information onto an information recording medium; a detrack detecting device for detecting occurrence of detrack during the recording of the information; and a controlling device for controlling the recording device to return to a location where the detrack has occurred and restart the recording if the occurrence of the detrack is detected.

The above object of the present invention can be also achieved by an information recording method provided with: a recording process of recording information onto an information recording medium; a detrack detecting process of detecting occurrence of detrack during the recording of the information; and a controlling process of controlling the recording device to return to a location where the detrack has occurred and restart the recording if the occurrence of the detrack is detected.

The above object of the present invention can be also achieved by a computer program for record control to control a computer provided for the information recording apparatus of the present invention, the computer program making the computer function as at least one portion of the recording device, the detrack detecting device and the controlling device.

These effects and other advantages of the present invention become more apparent from the following embodiments and examples.

BRIEF DESCRIPTION OF DRAWINGS

FIG. 10 are data structural views conceptually showing data recorded by another example of the operation after the detrack detection of the information recording apparatus in the example.

FIG. 11 is a data structural view conceptually showing one procedure of the operation when detrack is detected during the recording in a multilayer optical disc, on the information recording apparatus in the example.

FIG. 13 is a data structural view conceptually showing another procedure of the operation when detrack is detected during the recording in a multilayer optical disc, on the information recording apparatus in the example.

DESCRIPTION OF REFERENCE CODES

Figure 1:
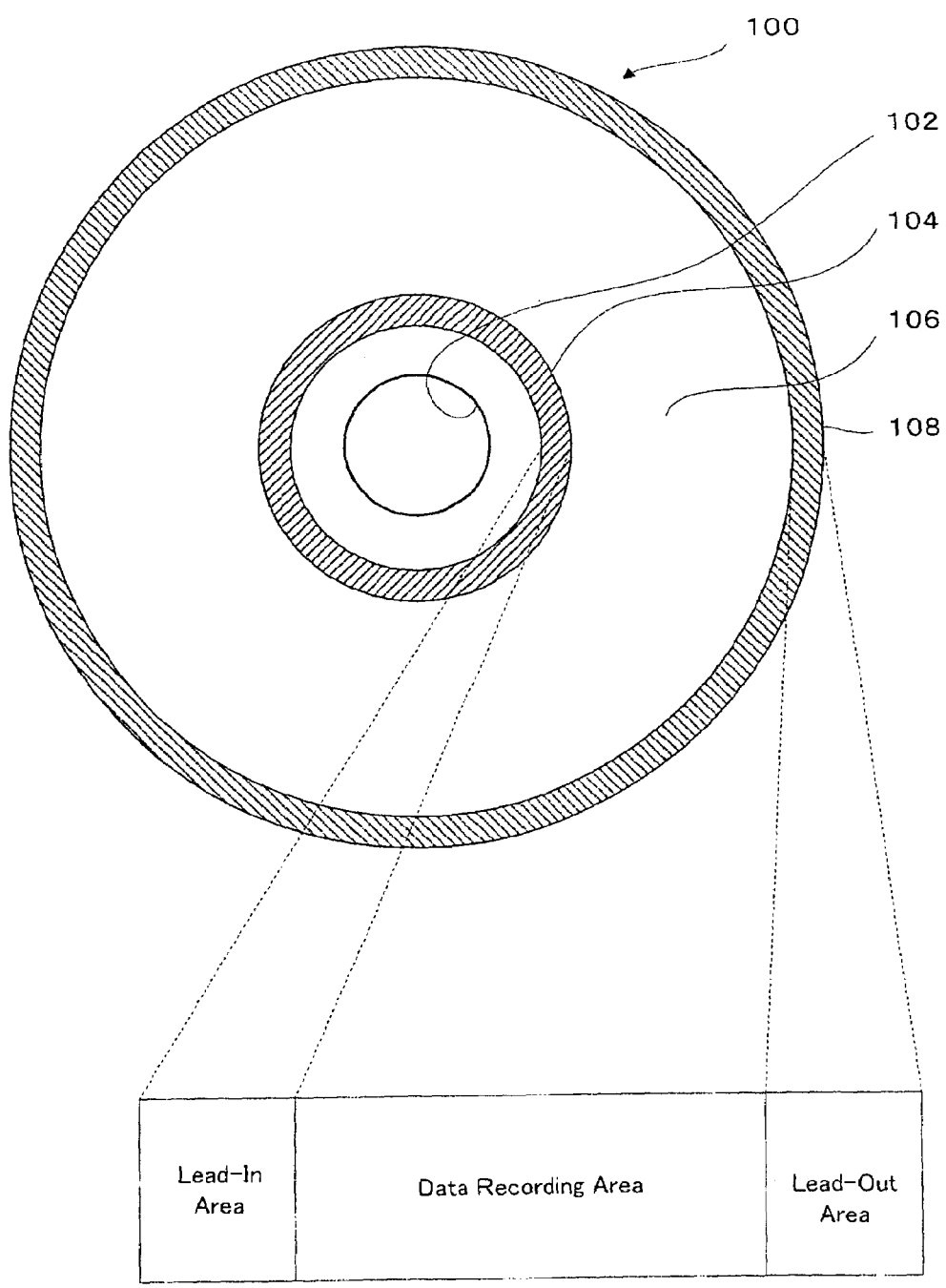
FIG. 1 shows the basic structure of an optical disc which is used by an example according to the information recording apparatus of the present invention, wherein the upper part is a substantial plan view showing the optical disc having a plurality of recording areas and the corresponding lower part is a schematic conceptual diagram showing a recording area structure in the radial direction.

1 Information recording apparatus
100 Optical disc
104, 114, 124 Lead-in area
108, 118, 128 Lead-out area
110, 120 OPC area
111, 121 Defect management area
112, 122 Control information area
113, 123 File system
114, 124 Spare area
501 Optical pickup
523 Dropout detector
534 TE detector
535 Wobble detector
536 LPP detector
537 FE detector
550 Detrack detector
560 CPU

BEST MODE FOR CARRYING OUT THE INVENTION

Hereinafter, an information recording apparatus, an information recording method, and a computer program according to embodiments of the present invention will be discussed in order.

(Embodiment of Information Recording Apparatus)

An embodiment of the information recording apparatus in the present invention is provided with: a recording device for recording information onto an information recording medium; a detrack detecting device for detecting occurrence of detrack during the recording of the information; and a controlling device for controlling the recording device to return to a location where the detrack has occurred and restart the recording if the occurrence of the detrack is detected.

According to the embodiment of the information recording apparatus in the present invention, by using the recording device which includes an optical pickup, a buffer, an encoder and the like, it is possible to record various information including content information, such as video information and audio information, data information for a computer or the like, onto an information recording medium, such as a DVD and a CD, for example.

Particularly in the embodiment, the detrack detecting device and the controlling device are provided. The detrack detecting device detects whether or not the detrack has occurred during the recording of the information performed by the recording device. For example, in the case of the information recording medium which records the information onto an optical disc such as a DVD, the occurrence of the detrack is detected by monitoring the focus position and the tracking position or the like of laser irradiated by an optical pickup or the like, as described later, for example.

Then, if the detrack is detected by the detrack detecting device, the controlling device controls the recording device to return to the location where the detrack has occurred (i.e. a position before an improper jump by the detrack has been caused) and restart or resume the recording of the information which was recorded until then.

Previously, there was such a technical problem that if the occurrence of the detrack is detected, the subsequent recording is incorrect recording, and the information recording medium cannot be used any more due to the incorrect recording. However, according to the information recording apparatus in the embodiment, even if the detrack occurs, it is possible to return to the same position and record the information again. Therefore, regardless of whether or not the detrack occurs, it is possible to appropriately record the information.

In addition, as described later, if it is constructed to judge whether or not an incorrectly recorded portion can be reproduced (i.e. an error caused by the incorrect recording can be corrected), it is also possible to further perform the recording and reproduction or the like of the information in the incorrectly recorded portion even if the incorrect recording is performed. In other words, even if the detrack occurs, it is possible to make a user of the information recording apparatus recognize that the appropriate recording operation or the like is continued in the same manner as the case where there is not the detrack. Moreover, as described later, by performing the recording operation while buffering the information that can be immediately recorded (or in order to understand at least how much of the information, which is to be recorded, is recorded) in a buffer of a predetermined size, it is possible to restart actual recording with respect to the location where the detrack has occurred or an alternative area, without excess or deficiency, from the information in which the recording is to be restarted among the information stored in the buffer, in accordance with how much of information has been reproducibly recorded, when the detrack occurs.

Consequently, according to the information recording apparatus in the embodiment, even if the detrack occurs during the recording operation, it is possible to record the information, appropriately, and it is also possible to enable an information reproducing apparatus to appropriately reproduce the data on the information recording medium in which the detrack has occurred. By this, there is such a great advantage that it is possible to effectively use the optical disc which cannot be used conventionally.

Incidentally, the information recording medium on which the recording can be performed by the information recording apparatus in the embodiment may be an information recording medium with a single layer, or may be an information recording medium with a plurality of recording layers. Then, the detrack detecting device can detect not only the detrack on the same recording layer but also the detrack from one layer to another layer (so-called defocus) out of the plurality of recording layers. In these points, the information recording apparatus in the embodiment has a more excellent effect, as compared to the above-mentioned prior art.

In one aspect of the embodiment of the information recording apparatus in the present invention, the information recording apparatus further comprises a buffer of a predetermined size for buffering the information and supplying it to the recording device, and the controlling device controls the buffer and the recording device to restart the recording from a location where the recording is to be restarted with using the information stored in the buffer.

According to this aspect, by using the information stored in the buffer, it is possible to immediately restart the recording. In other words, without performing various operations, such as modulation, which are necessary to record the information, it is possible to restart the recording of the information, and the recovery from the detrack can be achieved, more quickly.

In another aspect of the embodiment of the information recording apparatus in the present invention, the predetermined size is equal to or greater than an error-correctable minimum unit.

In another aspect of the embodiment of the information recording apparatus in the present invention, the information recording apparatus further comprises a judging device for judging whether or not error correction can be performed with respect to an area of a detrack destination into which the recording device incorrectly records the information, if the occurrence of the detrack is detected, and the controlling device controls the recording device to return to the location where the detrack has occurred and restart the recording in such a condition that it is judged that the error correction can be performed.

According to this aspect, by the judgment of the judging device, it is possible to judge whether or not the incorrectly recorded portion (i.e. the area or recording area) can be used (i.e. whether or not the incorrectly recorded portion can be reproduced, for example), relatively easily. Here, "the error correction can be performed (or error correctable)" indicates the situation that the incorrectly recorded portion can be reproduced or the information can be further recorded by performing a certain process (or even as it is), even in the incorrect recording. For example, error correction by an ECC (Error Correction Code) is taken as an example. Moreover, the "the recording device incorrectly records the information (i.e. incorrect recording)" in the present invention includes a concept which indicates the situation that the information cannot be recorded into a position into which the information is to be recorded originally (i.e. a recording position before the occurrence of the detrack, for example) due to the occurrence of the detrack. Therefore, if it is judged that the error correction can be performed by the judgment, the incorrectly recorded portion can be used again, and the recording capacity of the information recording medium can be used, effectively. Thus, the present invention includes an excellent advantage that the above-mentioned background art does not have, in the point that it is possible not only to detect the detrack and return to an original position, but also to judge whether or not the recording area of the detrack destination can be used, and then to use the recording area of the detrack destination. Moreover, because such a judging device is provided, it is possible to adopt various constructions described later, and by that, it is possible to receive various benefits.

Incidentally, as the judging method of the judging device, the judgment may be performed on the basis of the error correction capability of the ECC, as described later, or by performing a reproduction check in the incorrectly recorded portion, as described later.

Moreover, if it is judged that the error correction can be performed, it is possible to restart the recording again and appropriately perform the subsequent recording operation, without taking special processing to the incorrectly recorded portion.

In an aspect of the information recording apparatus provided with the judging device, as described above, the controlling device may control the recording device to register the area of the detrack destination, as an unallocated area, and to return to the location where the detrack has occurred and to restart the recording if it is judged that the error correction cannot be performed.

By such construction, it is possible to prevent the incorrectly recorded portion from being incorrectly reproduced. As a result, even in the information recording medium in which the detrack has occurred, the subsequent reproduction can be appropriately performed by an information reproducing apparatus.

Incidentally, the unallocated area indicates a "defect area", for example, and indicates a part of the area on the information recording medium at which the information which cannot be physically or optically reproduced is recorded. The position, the size or the like of the defect area are managed in defect management information which is recorded in a lead-in area, as described later. Therefore, even if the information on the information recording medium is reproduced on the information reproducing apparatus, such as a player, it is possible to appropriately reproduce the information while keeping away from the defect area, by reading the defect management information.

Moreover, even in the case of an information recording medium which does not support the registration as the defect area as described above, if the unallocated area is registered into management information (e.g. a file system described later) included in the lead-in area described later, for example, it is possible to prevent the disadvantage of the reproduction of the incorrectly recorded portion. In other words, in the case of general information recording media which are now marketed, such as a CD and a DVD, because they have the management information, there is such an advantage that the information recording apparatus in the embodiment described above can receive the benefit in this aspect.

In an aspect of the information recording apparatus provided with the judging device, as described above, the controlling device may control the recording device to further register the area of the detrack destination incorrectly recorded, as a caution area if it is judged that the error correction can be performed.

By such construction, even if the error correction can be performed in the area of the detrack destination, it is possible to distinguish between the area of the detrack destination and another normal recording portion or an unrecorded portion. Therefore, after that, if the information is recorded into the area of the detrack destination, it is possible to record the information, more appropriately, by performing an advanced recording check (e.g. a reproduction check after the recording, or the like), as compared to the normal recording. Moreover, in the reproduction of the caution area performed by the information reproducing apparatus, it is possible to perform the reliable reproduction of the information, by performing a more advanced reproduction check (e.g. the error correction of a reproduction signal, or the like).

However, in the case in which it is judged that the area of the detrack destination is error correctable, the recording may be continued, as it is, without registration as the caution area. In this case, it is possible to receive the various benefits owned by the information recording apparatus in the embodiment.

In an aspect of the information recording apparatus on which the registration as the caution area is performed, as described above, the controlling device may control the recording device to register the caution area as an unallocated area if the area of the detrack destination is the caution area.

In another aspect of the embodiment of the information recording apparatus in the present invention, the controlling device may control the recording device to register an area in another layer corresponding to the area of a detrack destination in one layer incorrectly recorded, as an unallocated area, when the information recording medium is an information recording medium having a multiple recording layers.

According to this aspect, even in the case in which the detrack from another layer to one layer occurs, it is possible to prevent an influence on another layer which may be caused by the incorrect recording in the one layer, and it is possible to record the information, more reliably. More specifically, in the case of an information recording medium having two recording layers, for example, if the detrack occurs with respect to the recording layer in the rear side, as viewed from the recording device, during the recording in the recording layer in the front side, as viewed from the recording device, it is assumed that not only the recording layer in the rear side but also the recording layer in the front side which is located between the recording device and the recording layer in the rear side, are also influenced somehow. In this case, out of the recording layer in the front side, a portion which is assumed to be somehow influenced is registered as the defect area or the unallocated area.

Incidentally, the "portion in another layer corresponding to the portion in one layer into which the information is incorrectly recorded" in the present invention is a concept in which if the detrack occurs during the recording at a position with a track number of 100 in one layer, for example, and if the incorrect recording is performed at a position with a track number of 100 in another layer, not only the position with the track number of 100 in another layer but also its surrounding area portion which is assumed to be influenced by the incorrect recording are registered as the unallocated area. In other words, the term "corresponding to" in the present invention is a concept which indicates that the term includes not only the portion in another layer with the same track number as that in one layer, but also the surrounding area portion which can be influenced by the incorrect recording. However, registering the portion in another layer with the same track number as that in one layer as the defect area or the unallocated area is also included in the scope of the present invention.

(Embodiment of Information Recording Method)

A first embodiment of the information recording method in the present invention is provided with: a recording process of recording information onto an information recording medium; a detrack detecting process of detecting occurrence of detrack during the recording of the information; and a controlling process of controlling the recording device to return to a location where the detrack has occurred and restart the recording if the occurrence of the detrack is detected.

According to the embodiment of the information recording method in the present invention, the information is recorded in the recording process, and the occurrence of the detrack is detected in the detrack detecting process if the detrack occurs during the recording. Then, in the controlling process, for example, an optical pickup or the like can be returned to the location where the detrack has occurred, and the recording can be restarted. Therefore, it is possible to receive the same various benefits as those of the above-mentioned embodiment of the information recording apparatus in the present invention.

Incidentally, in response to the various aspects of the above-mentioned embodiment of the information recording apparatus in the present invention, the embodiment of the information recording method in the present invention can also adopt various aspects.

(Embodiment of Computer Program)

An embodiment of the computer program in the present invention makes a computer function as the above-mentioned embodiment of the information recording apparatus (including its various aspects). More specifically, it makes the computer function as at least one portion of the recording device, the detrack detecting device, and the controlling device in the above-mentioned embodiment of the information recording apparatus.

According to the embodiment of the computer program in the present invention, the above-mentioned embodiment of the information recording apparatus in the present invention can be relatively easily realized as a computer reads and executes the computer program from a program storage device, i.e. computer-readable medium, such as a ROM, a CD-ROM, a DVD-ROM, and a hard disk, or as it executes the computer program after downloading the program through a communication device.

Incidentally, in response to the various aspects of the above-mentioned embodiment of the information recording apparatus in the present invention, the embodiment of the computer program in the present invention can also adopt various aspects.

The above object of the present invention can be also achieved by an embodiment of a computer program product in a computer-readable medium for tangibly embodying a program of instructions executable by a computer, to make the computer function as the above-mentioned embodiment of the information recording apparatus of the present invention (including its various aspects). More specifically, it makes the computer function as at least one portion of the recording device, the detrack detecting device, and the controlling device in the above-mentioned embodiment of the information recording apparatus of the present invention.

According to the embodiment of the computer program product of the present invention, at least one portion of the recording device, the detrack detecting device, and the controlling device in the above-mentioned embodiment of the information recording apparatus of the present invention can be embodied relatively readily, by loading the computer program product from a computer-readable medium for storing the computer program product, such as a ROM (Read Only Memory), a CD-ROM (Compact Disc-Read Only Memory), a DVD-ROM (DVD Read Only Memory), a hard disk or the like, into the computer, or by downloading the computer program product, which may be a carrier wave, into the computer via a communication device. More specifically, the computer program product may include computer readable codes to cause the computer (or may comprise computer readable instructions for causing the computer) to function as at least one portion of the recording device, the detrack detecting device, and the controlling device in the above-mentioned embodiment of the information recording apparatus of the present invention.

These effects and other advantages of the present invention become more apparent from the following examples.

EXAMPLE

Hereinafter, the example of the present invention will be discussed.

At first, with reference to FIG. 1, an information recording medium used in the example according to the information recording apparatus of the present invention will be discussed. In the example, an explanation will be given by using an optical disc as the information recording medium. FIG. 1 shows the structure of the optical disc having a plurality of recording areas in a substantial plan view on the upper side, and shows a recording area structure in the radial direction in a conceptual view on the lower side.

As shown in FIG. 1, in an optical disc 100, for example, recording (writing) can be performed a plurality of times or once, in various recording methods, such as a magneto optical method and a phase change method. The optical disc 100 has a recording surface on a disc main body with a diameter of about 12 cm, as is a DVD. On the recording surface, the optical disc 100 is provided with: a lead-in area 104; a data recording area 106; and a lead-out area 108, from the inner circumference to the outer circumference, with a center hole 102 as the center. Then, in each recording area, groove tracks and land tracks are alternately provided, spirally or concentrically, with the center hole 102 as the center. The groove tracks may be wobbled, or pre-pits may be formed on one of or both of the tracks. Incidentally, the present invention is not particularly limited to the optical disc having these three areas. For example, even if the lead-in area 104 or the lead-out area 108 does not exist, a file structure explained below can be constructed. Moreover, as described later, the lead-in area 102 and the lead-out area 108 may be further segmentized (refer to FIG. 9, etc.).

Next, with reference to FIG. 2 to FIG. 13, an example according to the information recording apparatus of the present invention will be discussed.

(Basic Structure of Information Recording Apparatus)

Figure 2:
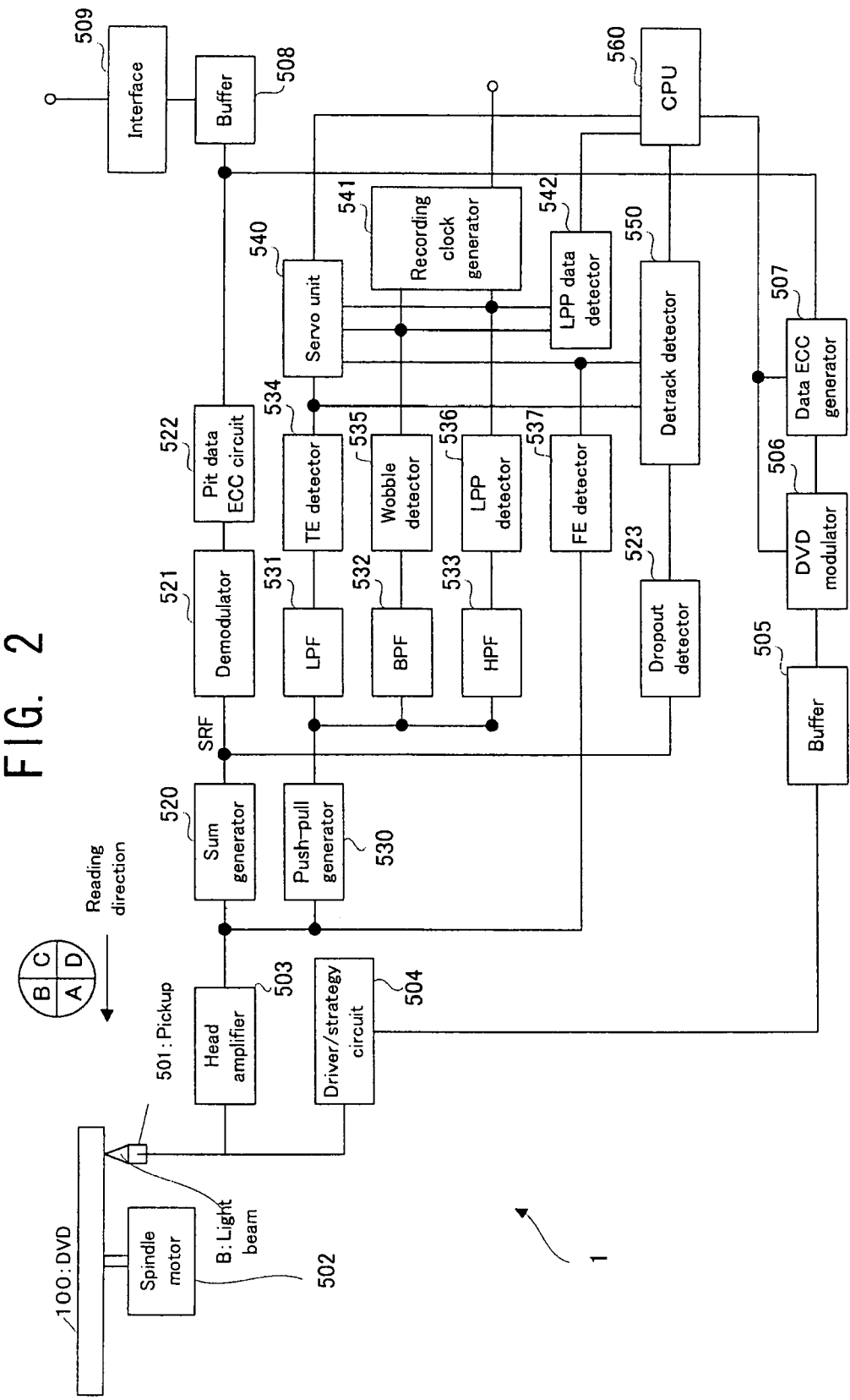
FIG. 2 is a block diagram conceptually showing the basic structure of the example according to the information recording apparatus of the present invention.

At first, with reference to FIG. 2, the basic structure of the information recording apparatus in the example will be discussed. FIG. 2 is a block diagram conceptually showing the basic structure of the information recording apparatus in the example.

As shown in FIG. 2, an information recording apparatus 1 is provided with: an optical pickup 501; a spindle motor 502; a head amplifier 503; a driver/strategy circuit 504; a buffer 505; a DVD modulator 506; a data FCC (Error Correction Code) generator 507; a buffer 508; an interface 509; a sum generator 520; a demodulator 521; a pit data FCC circuit 522; a dropout detector 523; a push-pull generator 530; a LPF (Low Pass Filter) 531; a BPF (Band Pass Filter) 532; a HPF (High Pass Filter) 533; a TE (Tracking Error) detector 534; a wobble detector 535; a LPP (Land Pre Pit) detector 536; a FE (Focus Error) detector 537; a servo unit 540; a recording clock generator 541; a LPP data detector 542; a detrack detector 550; and a CPU 560.

The optical pickup 501 is intended to perform the recording/reproduction with respect to the optical disc 100, and is provided with a semiconductor laser device, various lenses, an actuator and the like. More specifically, the optical pickup 501 irradiates the optical disc 100 with a light beam B, such as laser light, as reading light with a first power upon reproduction, and as writing light with a second power upon recording with it modulated. The optical pickup 501 is constructed to be displaced along with the radial direction or the like of the optical disc 100, in accordance with tracking servo, by a not-illustrated actuator, slider or the like, which is driven by the control of the servo unit 540. In addition, it is constructed such that the focus of the light beam B can be changed in accordance with focus servo, by the control of the servo unit 540, and that focus control can be performed.

Moreover, the optical pickup 501 is provided with a not-illustrated four-divisional detection circuit. The reflected light of the light beam B is divided into four areas A, B, C and D shown in the upper part of FIG. 2, and the four-divisional detection circuit outputs each signal corresponding to the quantity of light in respective one of the areas.

The spindle motor 502 is constructed to rotate the optical disc 100 at a predetermined speed under spindle servo from the servo unit 540 or the like.

The head amplifier 503 amplifies each output signal (i.e. the reflected light of the light beam B) of the optical pickup 501, and outputs a divisional read signal a corresponding to the area A, a divisional read signal b corresponding to the area B, a divisional read signal c corresponding to the area C and a divisional read signal d corresponding to the area D.

The driver/strategy circuit 504 drives the semiconductor laser disposed in the optical pickup 501, in order to determine an optimum recording laser power. After that, the driver/strategy circuit 504 drives the semiconductor of the optical pickup 501 with the optimum recording laser power determined by an OPC (Optical Power Calibration) process, upon the data recording. Upon the data recording, the optimum laser power is modulated in accordance with the record data.

Incidentally, the OPC process is a process of detection of the optimum recording laser power (i.e. calibration of the recording laser power). More specifically, in an OPC area 110 described later (refer to FIG. 9, etc.), for example, a short pit corresponding to a 3 T pulse and a long pit corresponding to 11 T pulse are alternately formed with respective non-recording sections (i.e. space sections), which have the same length as that of the short pit or the long pit. The formation is performed with sixteen different laser powers, for example, to thereby calculate a recording laser power for recording so as to minimize the influence of asymmetry and obtain the best reproduction quality. Moreover, the "asymmetry" is a phenomenon in which the short pit or the long pit gradually becomes longer or shorter, respectively, by the same amount in the length direction thereof.

The buffer 505 stores therein the record data modulated by the DVD modulator 506 and outputs it to the drive/strategy circuit 504.

The DVD modulator 506 can perform DVD modulation with respect to the record data, and output it to the buffer 505. As the DVD modulation, for example, 8-16 modulation may be performed.

The data ECC generator 507 appends or adds a code for error correction to the record data which is inputted from the interface 509. Specifically, the data ECC generator 507 appends an ECC code in each predetermined block unit (e.g. ECC cluster unit), and outputs it to the DVD modulator 506.

The buffer 508 buffers the record data which is inputted from the interface 509, and outputs it to the ECC generator 507, as occasion demands. Moreover, the buffer 508 buffers the reproduction data which is outputted from the pit data ECC circuit 522, and outputs it to external output equipment through the interface 509, as occasion demands.

The interface 509 can receive the input of the record data from external input equipment, and output the reproduction data to the external output equipment.

Therefore, upon the normal data recording, the ECC is appended on the data ECC generator 507, with respect to a recording signal which is inputted from the interface through the buffer 508, and then, the DVD modulation is performed on the DVD modulator 506. Then, it is outputted to the driver/strategy circuit 504 through the buffer 505, by which the optical pickup is driven with the optimum recording power and the recording is performed on the optical disc 100.

The sum generation circuit 520 is provided with an addition circuit for adding the divisional read signals a, b, c and d and for outputting a sum read signal SRF. Incidentally, the sum read signal SRF is a signal which represents the length of a record mark.

The demodulator 521 reproduces pit data on the basis of the sum read signal SRF. More specifically, the demodulator 521 demodulates the reproduced pit data by using a predetermined table, with setting a synchronization signal for reproduction as a reference position, for example, to thereby generate the reproduction data. For example, if EFM modulation is adopted as a modulating method, a process of converting the 14 bits of pit data to 8 bits of reproduction data is performed. Then, a descramble process is performed in which the order of the reproduction data is rearranged in accordance with a predetermined rule, and the processed reproduction data is outputted.

The pit data ECC circuit 522 performs an error correction process, an interpolation process or the like, with respect to the reproduction data generated on the demodulator 521. Then, the reproduction data is outputted to the interface 509 through the buffer 508, and is reproduced on the external output equipment, such as a speaker and a display.

The dropout detector 523 can detect whether or not the sum read signal SRF is outputted from the sum generator 520. Then, a result of the detection, i.e. whether the sum read signal SRF is outputted or not outputted, is outputted to the detrack detector 550.

The push-pull signal generator 530 calculates (a+d)−(b+c) and generates a push-pull signal. The component (a+d) corresponds to the areas A and D which are on the left side on the reading direction, while the component (b+c) corresponds to the areas B and C which are on the right side on the reading direction. The value of the push-pull signal indicates a relative position relationship between the light beam B and the pit.

The LPF 531 cuts a signal component on the high-frequency band side, out of the push-pull signal outputted from the push-pull signal generator 530, and outputs a signal component on the low-frequency band side to the TE detector 534. In other words, here, a tracking error signal component is extracted and outputted to the TE detector 534.

The BPF 532 extracts a signal component associated with a wobble signal, out of the push-pull signal outputted from the push-pull signal generator 530, and outputs it to the wobble detector 535.

The HPF 533 cuts a signal component on the low-frequency band side, out of the push-pull signal outputted from the push-pull signal generator 530, and outputs a signal component on the high-frequency band side to the LPP detector 536. In other words, here, an LPP signal is extracted and outputted to the LPP detector 536.

The TE detector 534 detects a tracking error from the tracking error signal component out of the push-pull signal which is inputted through the LPF 531. Then, the TE detector 534 outputs the tracking error signal to the servo unit 540. Moreover, this tracking error signal is also outputted to the detrack detector 550.

The wobble detector 535 detects the wobble signal component out of the push-pull signal which is inputted through the BPF 532. At the same time, the wobble detector 535 detects relative position information which is based on a slot unit corresponding to a length which is a natural number multiple of one cycle of the wobble signal for example, on the basis of the cycle of the wobble signal. Then, the wobble detector 535 is constructed to output the relative position information to the recording clock generator 541. Moreover, the relative position information is also outputted to the servo unit 540 and the LPP data detector 542.

The LPP detector 536 detects the LPP signal component out of the push-pull signal which is inputted through the HPF 533. At the same time, the LPP detector 536 detects pre-format address information indicated by an LPP (Land Pre-Pit), on the basis of the LPP signal. Then, it outputs the pre-format address information to the recording clock generator 541. Moreover, the pre-format address information is outputted to the servo unit 540 and the LPP data detector 542.

The FE detector 537 detects a focus error, on the basis of the distribution of signal intensity on the four-divisional detector, from the sum read signal SFR which is outputted from the sum generator 520. Then, the FE detector 537 outputs the focus error signal to the servo unit 540. Moreover, the focus error signal is also outputted to the detrack detector 550.

The servo unit 540 displaces the objective lens of the optical pickup 501, on the basis of the tracking error signal, the focus error signal, the wobble signal, the LPP signal or the like, which are obtained by processing the light receiving result of the optical pickup 501, to thereby perform various servo processes, such as tracking control, focus control, spindle control and the like.

The recording clock generator 541 generates and outputs a timing signal which indicates a reference clock to perform the data recording, on the basis of the cycle of the wobble signal (or the relative position information) outputted from the wobble detector 535 and the pre-format address information outputted from the LPP detector 536. Thus, regardless of whether or not a recording start position upon the data recording starts from the management unit of the pre-format address information, it is possible to specify the recording start position.

The LPP data detector 542 can obtain various management information or the like which is necessary upon the recording, from the LPP signal outputted from the LPP detector 536. For example, as described later, it is possible to obtain a recommended recording power and recommended strategy or the like which are recorded by the LPP.

Particularly in the example, the detrack detector 550 can detect whether or not the detrack has occurred during the recording of the data onto the optical disc 100. More specifically, the detrack detector 550 is constructed such that the tracking error signal is inputted thereto from the TE detector 534 and the focus error signal is inputted thereto from the FE detector 537, and that it can monitor whether or not the tracking error signal and focus error signal are greater than a predetermined value. Moreover, the detrack detector 550 can monitor whether or not the sum read signal SFR outputted from the sum generator 520 is inputted, with using the output of the dropout detector 523. Moreover, the detrack detector 550 can compare timing in which the optical pickup 501 performs the recording (or the cycle of the wobble signal) with the timing signal generated by the recording clock generator 521. Moreover, the detrack detector 550 can monitor the pre-format address information (or physical address value) at a position where the optical pickup 501 performs the recording. In this case, it is preferable to construct the detrack detector 550 such that the detrack detector 550 can obtain the pre-format address information from the LPP detector 536 via a not-illustrated signal line. Moreover, if the optical disc 100 is an optical disc having multiple recording layers, it is preferably constructed such that a layer flag for identifying each layer can be detected.

Then, the detrack detector 550 detects whether or not the detrack occurs on the optical disc 100 during the recording, on the basis of the monitored signal and flag or the like. If at least one of the signals shows an abnormal value, it is possible to judge that the detrack occurs. Alternatively, if two or more combinations of the signals show abnormal values, it is possible to judge that the detrack occurs.

In addition, the detrack detector 550 can detect a position where the detrack has occurred on the optical disc 100 (e.g. a physical address value on the optical disc 100) and a time length in which incorrect recording is performed with respect to the optical disc 100 after the occurrence of the detrack (or a distance with which the incorrect recording is performed, a size of the recording area at which the incorrect recording is performed or the like).

Incidentally, the detection operation of these will be described later in detail. Moreover, it is preferable to construct the detrack detector 550 to output a signal which indicates the occurrence of the detrack to the CPU 560.

The CPU 560 controls an information recording apparatus 1 as a whole, by giving an instruction, i.e. by outputting a system command, to each device, such as the driver/strategy circuit 504, the servo unit 540, the LPP data detector 542 and the detrack detector 550, in order to detect the optimum recording laser power. Moreover, if the occurrence of the detrack is inputted by the detrack detector 550, a command to stop the subsequent recording of the data is preferably outputted to the optical pickup 501 or the like. Normally, software for operating the CPU 560 is stored in an internal or outer memory.

Next, with reference to FIG. 3 and FIG. 4, the detrack will be explained conceptually. FIG. 3 are schematic diagrams conceptually showing the occurrence of the detrack in a single-layer disc. FIG. 4 are schematic diagrams conceptually showing the occurrence of the detrack in a two-layer disc.

Figure 3A:
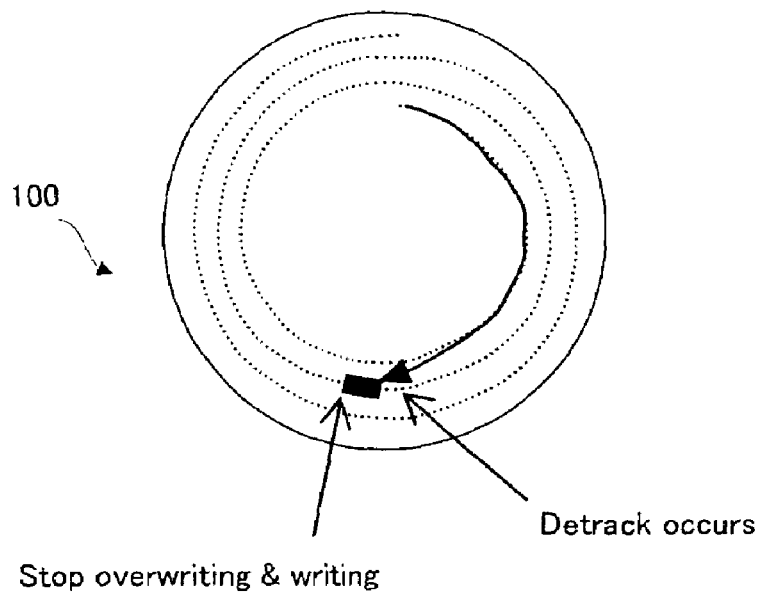
FIG. 3 are schematic diagrams conceptually showing one example of detrack in a single-layer disc.

As shown in FIG. 3(a), in recording the data along the track (a portion represented in a dotted line in the figure) from the inner circumferential side to the outer circumferential side of the optical disc 100, the detrack possibly occurs toward the outer circumferential side (i.e. toward an unrecorded portion). At this time, the detrack detector 550 may judge that the detrack occurs, by detecting such phenomena that (i) the SRF signal is not detected any more, (ii) the tracking error signal becomes large, (iii) a synchronization signal for recording (i.e. the timing signal) is not inputted in predetermined timing any more, (iv) a pre-address becomes discontinuous and/or similar phenomena.

Figure 3B:
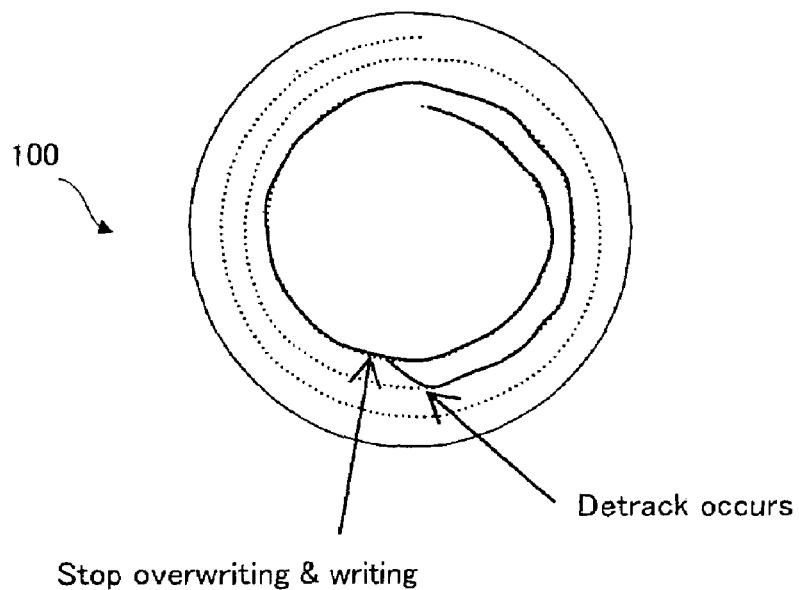

Moreover, as shown in FIG. 3(b), in recording the data along the track from the inner circumferential side to the outer circumferential side of the optical disc 100, the detrack possibly occurs toward the inner circumferential side (i.e. toward an already-recorded portion). At this time, the detrack detector 550 may judge that the detrack occurs, by detecting such phenomena that (i) the SRF signal is not detected for a moment, (ii) the tracking error signal becomes large, (iii) the synchronization signal for recording is not inputted in predetermined timing any more, (vi) a signal which indicates the reflected light of the light beam B changes, (v) a pre-address becomes discontinuous, and/or similar phenomena.

Of course, even in the case in which the recording is performed from the outer circumferential side to the inner circumferential side, the above-mentioned detrack occurs, and even in the case of a write-once type optical disc and a rewritable type optical disc, the same type of detrack occurs.

Then, the detrack detector 550 is preferably constructed to appropriately detect the detrack.

Figure 4A:
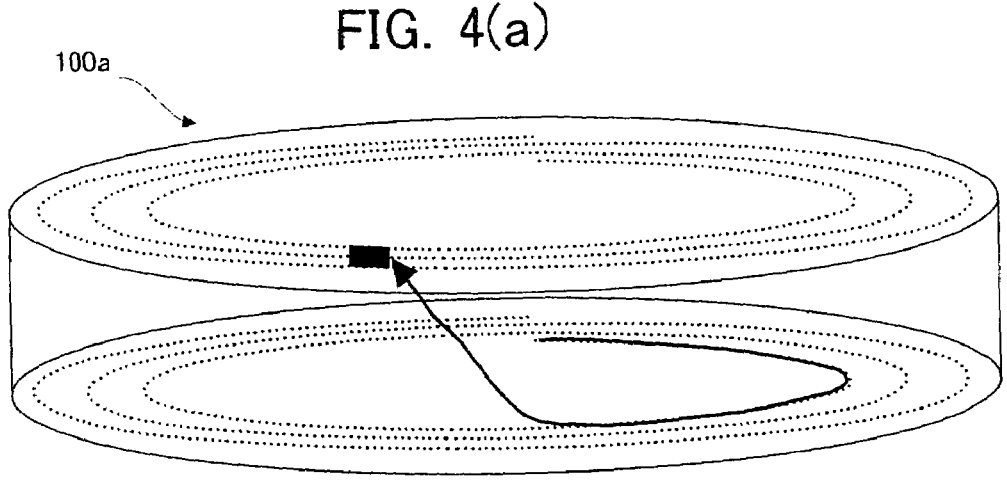
FIG. 4 are schematic diagrams conceptually showing one example of detrack in a two-layer disc.

Moreover, in the case of a multilayer optical disc 100a, as shown in FIG. 4(a), in performing the recording in a lower layer, the detrack possibly occurs toward an upper layer into which the data is not recorded. At this time, the detrack detector 550 may judge that the detrack occurs, by detecting such phenomena that (i) the SRF signal is not detected any more, (ii) the tracking error signal becomes large, (iii) synchronization signal for recording is not inputted in predetermined timing any more, (vi) the focus error signal becomes large, (v) the pre-address becomes discontinuous, (vi) the layer flag is different, and/or similar phenomena.

Figure 4B:
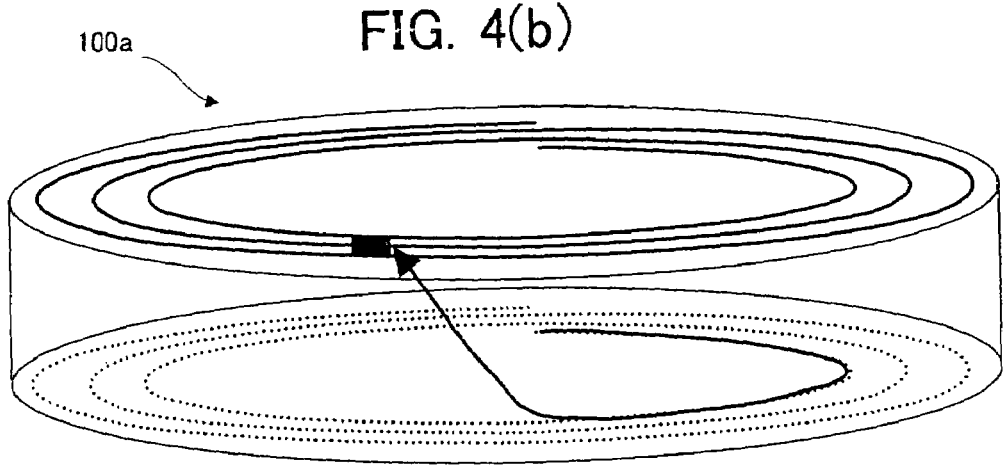

Moreover, as shown in FIG. 4(b), in performing the recording in the lower layer, the detrack possibly occurs toward an upper layer into which the data is already recorded. At this time, the detrack detector 550 may judge that the detrack occurs, by detecting such phenomena that (i) the SRF signal is not detected any more, (ii) the tracking error signal becomes large, (iii) the synchronization signal for recording is not inputted in predetermined timing any more, (vi) the focus error signal becomes large, (v) a signal which indicates the reflected light of a reproduction beam changes, (vi) the pre-address becomes discontinuous, (vi) the layer flag is different, and/or similar phenomena.

Moreover, as described above, the detrack detector 550 detects the position where the detrack has occurred and the time length in which the optical pickup continues the incorrect recording due to the detrack (or a distance, a size of the incorrectly recorded recording area, or the like).

Incidentally, the information recording apparatus in the example which is explained with reference to FIG. 2 is also used as the example of an information recording/reproducing apparatus. In other words, it can reproduce the record information through the head amplifier 503, the sum generator 520, the demodulator 521, and the pit data FCC circuit 522, and it includes the function of an information reproducing apparatus or the function of an information recording/reproducing apparatus in the example.

(Operation Principle of Information Recording Apparatus)

Figure 5:
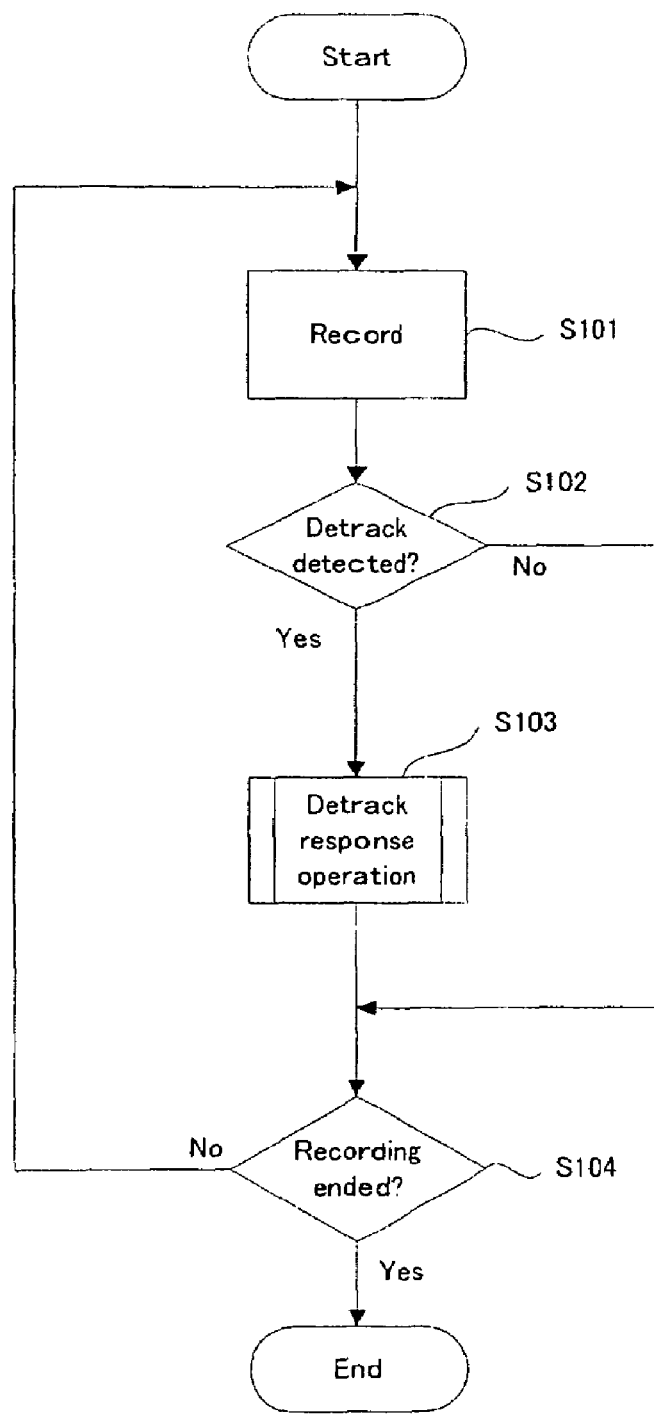
FIG. 5 is a flowchart showing a flow of the entire recording operation of the information recording apparatus in the example.
Figure 6:
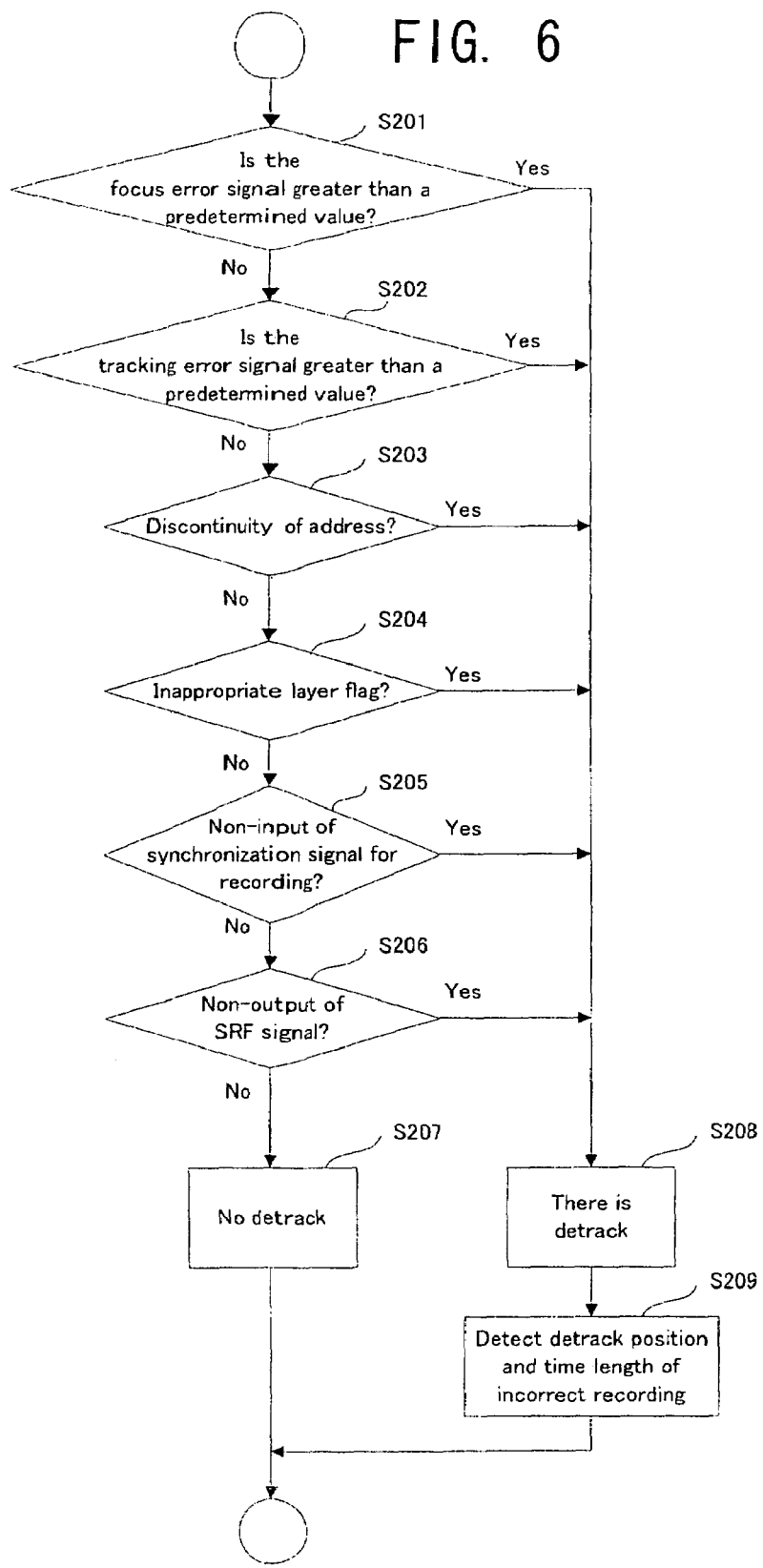
FIG. 6 is a flowchart showing a flow of the detrack detecting operation of the information recording apparatus in the example.
Figure 7:
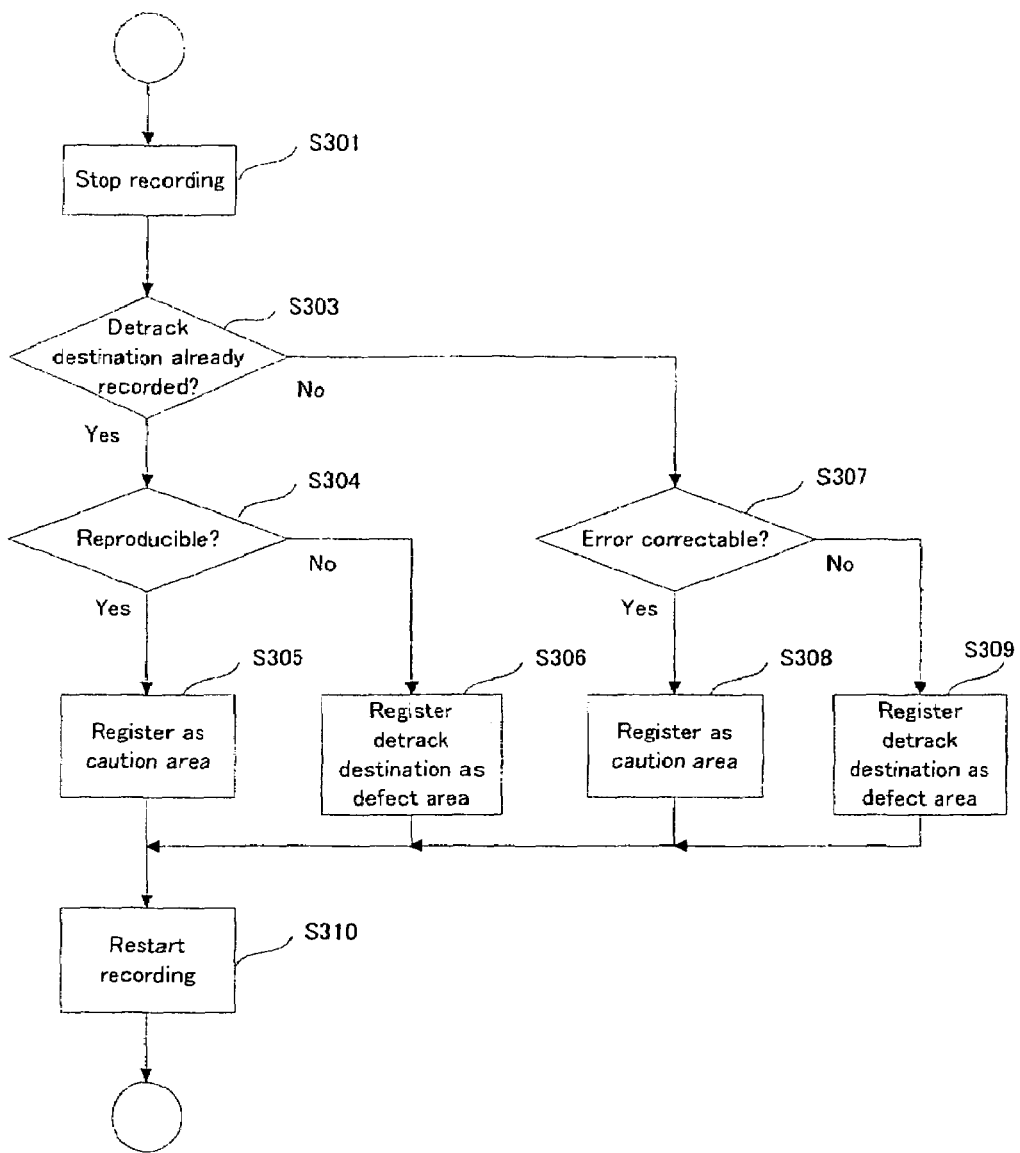
FIG. 7 is a flowchart showing a flow of an operation after the detrack detection of the information recording apparatus in the example.

Next, with reference to FIG. 5 to FIG. 7, the recording operation of the information recording apparatus 1 in the example will be explained. FIG. 5 is a flowchart showing a flow of the entire recording operation of the information recording apparatus in the example. FIG. 6 is a flowchart showing a flow of the detrack detecting operation of the information recording apparatus in the example. FIG. 7 is a flowchart showing a flow of an operation after the detrack detection of the information recording apparatus in the example.

(1) Entire Recording Operation

As shown in FIG. 5, the information recording apparatus 1 performs a recording operation as a normal operation (step S101). After that, the detrack detector 550 judges whether or not the detrack is detected, under the control of the CPU 560 (step S102). The detection operation of detecting the detrack will be described in detail later (refer to FIG. 6).

As a result of the judgment, if the detrack does not occur (step S102: No), the information recording apparatus 1 continues the recording and the operational flow goes to a step S104.

On the other hand, if the detrack occurs (step S102: Yes), the information recording apparatus 1 performs a response operation upon the detrack, by the control of the CPU 560 which is one specific example of the "controlling device" of the present invention (step S103). Incidentally, the response operation upon the detrack will be described later in detail (refer to FIG. 7).

Incidentally, the judgment operation in the step S102 may be periodically performed at predetermined intervals, or may be irregularly performed. Alternatively, the judgment operation may be always performed while the recording operation is continued. Moreover, an interrupt processing may be performed or trigger stats according to a detrack event. Moreover, it may be performed in predetermined timing under the control of the CPU 560, or may be performed by an instruction from the user of the information recording apparatus 1 which is inputted by using a remote controller and an operation button or the like, for example.

(2) Detection Operation of Detrack

Next, the detection operation of detecting the detrack will be discussed in detail. As shown in FIG. 6, the detrack detector 550 as being one specific example of the "detrack detecting device" of the present invention monitors the output from the FE detector 537 and judges whether or not the focus error signal is greater than a predetermined value (step S201). In the predetermined value, it is preferable to individually and concretely designate an appropriate predetermined value, experimentally, experientially, mathematically or theoretically, or by using simulations or the like, in accordance with the characteristics of the optical disc 100 and the characteristics of the focus error signal outputted from the FE detector 537, or the like.

As a result of the judgment, if the focus error signal is greater than the predetermined value (the step S201: Yes), the detrack detector 550 judges that the detrack occurs (step S208). On the other hand, if the focus error signal is equal to or less than the predetermined value (the step S201: No), then, the detrack detector 550 monitors the output from the TE detector 534 and judges whether or not the tracking error signal is greater than a predetermined value (step S202). Even in the predetermined value, as in the above-mentioned focus error signal, it is also preferable to individually and concretely designate an appropriate predetermined value, experimentally, experientially, mathematically or theoretically, or by using simulations or the like, in accordance with the characteristics of the optical disc 100 and the characteristics of the focus error signal outputted from the TE detector 532, or the like.

As a result of the judgment, if the tracking error signal is greater than the predetermined value (the step S202: Yes), the detrack detector 550 judges that the detrack occurs (the step S208). On the other hand, if the tracking error signal is equal to or less than the predetermined value (the step S202: No), then, the detrack detector 550 judges whether or not there is discontinuity of the address (e.g. a physical address on the optical disc 100) of the recording data (step S203).

At this time, the detrack detector 550 preferably monitors the physical address (or the pre-format address information, or the LPP signal) of the recording position of the data, to thereby judge whether or not the physical address has predetermined continuity. For example, if the physical address does not have the continuity, it can be assumed that the optical pickup 501 does not record the data continuously along the track on the optical disc 100 and that it records the data at a distant track position. Therefore, in this case, as long as there is no special condition, such that the CPU 560 gives an instruction to record the data at a track position away, for example, the detrack detector 550 may judge that the detrack occurs.

As a result of the judgment, if it is judged that there is discontinuity of the address (the step S203: Yes), the detrack detector 550 judges that the detrack occurs (the step S208). On the other hand, if it is judged that there is not any discontinuity of the address (the step S203: No), then, the detrack detector 550 judges whether or not the layer flag is inappropriate (step S204). In other words, it reads the layer flag provided with each recording layer on the optical disc 100 having a plurality of recording layers, to thereby judge whether or not the layer into which the data is to be recorded by the instruction of the CPU 560 is equal to the layer into which the data is actually being recorded. If they are equal, it may be judged that the layer flag is not inappropriate, and if they are not equal, it may be judged that the layer flag is inappropriate.

Incidentally, the operation in the step S204 may be not performed if the recording is performed on the optical disc 100 having a single recording layer.

As a result of the judgment, if it is judged that the layer flag is inappropriate (the step S204: Yes), the detrack detector 550 judges that the detrack occurs (the step S208). On the other hand, if it is judged that the layer flag is not inappropriate (the step S204: No), then, the detrack detector 550 judges whether or not the input of the synchronization signal for recording is inappropriate (step S205). Here, for example, in response to whether or not there is a shift or difference between the cycle of the wobble signal detected on the wobble detector 535 upon the recording and the synchronization signal (timing signal) generated by the recording clock generator 541 (i.e. whether or not there is a shift or difference between the timing that the optical pickup 501 records the data and the synchronization signal generated by the recording clock generator 541), if there is the shift, it may be judged that the input of the synchronization signal is inappropriate.

As a result of the judgment, if it is judged that the input of the synchronization signal for recording is inappropriate (the step S205: Yes), the detrack detector 550 judges that the detrack occurs (the step S208). On the other hand, if it is judged that the input of the synchronization signal for recording is not inappropriate (the step S205: No), the detrack detector 550 judges whether or not there is output of the SRF signal (step S206). Here, for example, the judgment may be performed on the basis of the input signal from the dropout detector 523.

As a result of the judgment, if it is judged that there is non-output of the SRF signal (the step S206: Yes), the detrack detector 550 judges that the detrack occurs (the step S208). On the other hand, if it is judged that there is not any non-output of the SRF signal (the step S206: No), the detrack detector 550 judges that the detrack does not occur at the present time point (step S207).

Then, in the step S208, if it is judged that the detrack occurs, an address at which the detrack has occurred and the time length in which the incorrect recording is performed at an area of the optical disc 100 into which the data is recorded after the detrack occurs or the like are obtained (step S209).

For example, by the operation of the detrack detector 550, the address at which the data is recorded immediately before the detection of the occurrence of the detrack may be treated as the "address at which the detrack has occurred". In other words, the pre-format address information (or physical address value) detected on the LPP detector 542 immediately before the detection of the occurrence of the detrack may be treated as the "address at which the detrack has occurred".

Moreover, by the operation of the detrack detector 550, a time length between a time point of the occurrence of the detrack and a time point when a "recording stop" operation described later is performed may be obtained as a "the time length in which the incorrect recording is performed". At this time, the operation in the step S209 may be performed at a time point when the operation in the step S301 in FIG. 7 is performed. Moreover, in spite of the time length in which the incorrect recording is performed, the amount of data transmitted from the memory (or the buffer 508, the buffer 505, or the like) between the time point of the occurrence of the detrack and a time point of a power down may be used to convert the distance.

Incidentally, the order of the detection operation in FIG. 6 is not limited to this, and it may be changed, as occasion demands. Moreover, as described above, by detecting a plurality of signals, it is also possible to detect the occurrence of the detrack, obviously.

More specifically, the detrack detector 550 is constructed to judge that the detrack occurs if three conditions are satisfied, such as (i) the SRF signal is not detected any more, (ii) the tracking error signal becomes large and (iii) the synchronization signal for recording is not inputted in predetermined timing any more, upon the occurrence of the detrack shown in FIG. 3(a), for example. In other words, the detrack detector 550 is preferably constructed to judge that the detrack occurs in the case in which it is judged that the SRF signal which is judged at the step S206 is detected any more, the tracking error signal which is judged at the step S202 is greater than the predetermined value and the input of the synchronization signal for recording which is judged at the step S205 is inappropriate. The same is true for other various types of detrack (e.g. detrack shown in FIG. 3 and FIG. 4).

(3) Operation Upon Detrack

Next, the response operation upon the occurrence of the detrack will be described in detail. As shown in FIG. 7, if the detrack is detected, the recording operation is stopped (step S301). Specifically, by the instruction of the CPU 560, the irradiation of the laser for recording from the optical pickup 501 is stopped. By this, it is possible to prevent the incorrect recording at a detrack destination. The stop of the recording operation is preferably performed at the same time of the detection of the occurrence of the detrack at the step S208 in FIG. 6. Then, the stop of the recording operation is preferably continued until the operation of responding to the detection of the detrack is completed.

However, considering that the recording operation of the data is performed again after the response operation of the detrack is completed, it is preferable to reduce the output power of the laser for recording to the degree that the data cannot be recorded, without stopping the irradiation of the laser for recording, to thereby stop the recording operation and detect the address of the detrack destination, synchronously.

Figure 8:
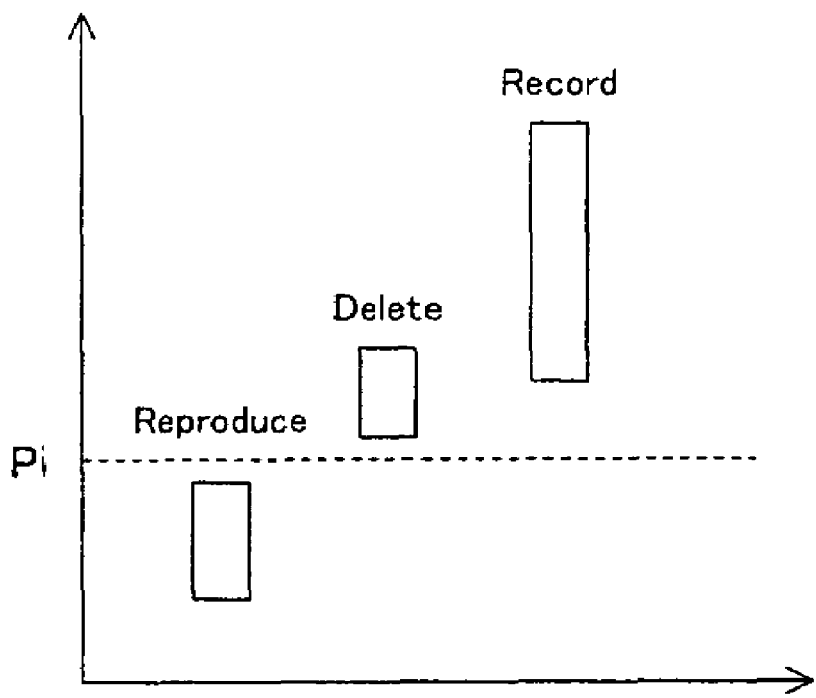
FIG. 8 is a graph conceptually showing a mutual relationship of a recording power, a reproduction power or the like of the information recording apparatus in the example.

More specifically, in general, the irradiation power of the laser can be divided into a range in which the data can be reproduced, a range in which the data can be deleted and a range in which the data can be recorded, depending on the value of the output power, as shown in FIG. 8. Therefore, in FIG. 8, if the output power is equal to or greater than Pi, it is possible to record the data. Moreover, if the output power is less than Pi, it is difficult or impossible to record the data, but possible to delete or reproduce the data. Therefore, in the step S301, it is preferable to reduce the output power of the optical pickup 501 to a predetermined value of less than Pi. By this, the data is not recorded into the recording layer which is irradiated with the laser. In addition, since the irradiation of the laser for recording is continued, there is such an advantage that it is possible to realize the quick restart of the recording operation, in restarting or resuming the recording again, after the response operation of the detrack is completed.

More preferably, the output power of the laser for recording is reduced to a value at which the data cannot be deleted. If there is the output power to the degree that the data can be deleted, the irradiation of the laser for recording possibly causes the condition of the recording layer of the optical disc 100 to be changed, which may have an adverse effect on the subsequent and appropriate recording of the data with respect to an area which is irradiated with the laser (i.e. the area where the incorrect recording is performed after the occurrence of the detrack). However, if the output power is reduced to the value at which the data cannot be deleted, there is such an advantage that even the irradiation of the laser for recording hardly influence the condition of the recording layer of the optical disc 100 (i.e. even afterward, it is possible to record the data, appropriately, with respect to the irradiated area).

In FIG. 7 again, the CPU 560 judges whether or not a position irradiated with the laser by the optical pickup 501 (i.e. the detrack destination) is a caution area (step S303). Here, for example, as described later, whether or not it is the caution area may be judged by referring to a file system 113 or the like, which is recorded in the lead-in area 114 of the optical disc 100.

Incidentally, the caution area indicates an area at which the incorrect recording was performed due to the detrack in the past and at which it is judged that error correction can be performed. The caution area will be described in detail later.

As a result of the judgment, if it is judged to be the caution area (the step 303: Yes), then, it is judged whether or not the data recorded at the detrack destination can be reproduced (step S304). In this case, the data is actually read, and it is judged whether or not the data can be reproduced (i.e. it can be outputted as the appropriate data), under the control of the CPU 560.

As a result of the judgment, if it is judged that the data can be reproduced (the step S304: Yes), after the incorrectly recorded area is registered as the caution area in the file system 113 or the like (step S305), the optical pickup 501 is displaced to the recording position into which the data is recorded before the occurrence of the detrack, and the recording is restarted (step S310). At this time, if the physical address of the area at which the recording operation is performed immediately before the detrack occurs is stored, the optical pickup 501 is displaced to the position with the physical address, under the control of the CPU 560 as being one specific example of the "controlling device" of the present invention, for example, and the rest of the data which is recorded immediately before the detrack occurs is recorded.

More specifically, when the detrack is detected, the memory-address of the data transmitted for writing, the pre-address and a writing clock count from a pre-recorded predetermined signal (e.g. the synchronization signal) are stored. The optical pickup is displaced back to a track before the track where the address at which the detrack has occurred exists. Then, while the data is read, a writing clock is synchronized with a reading clock, and at the same time, the clock is counted from the predetermined signal. If the optical pickup reaches the portion at which the detrack has occurred, the writing is restarted again.

On the other hand, if it is judged that the data cannot be reproduced (the step S304: No), in the same manner as explained in FIG. 9, the incorrectly recorded area is registered as a defect area (step S306). However, in the same manner as explained in FIG. 10, it may be registered as an unusable area or unallocated area in the file system 113. After that, the optical pickup 501 is displaced to the recording position before the detrack has occurred, and the recording is restarted again (the step S310).

On the other hand, as a result of the judgment in the step S303, if it is judged to be not the caution area (the step S303: No), then, it is judged whether or not the incorrectly recorded area is error correctable (step S307). In this case, the judgment is performed on the basis of whether or not the incorrectly recorded area (or an incorrectly recorded period) is beyond the correctable range (or capacity) of the ECC, under the control of the CPU 560. For example, if the incorrectly recorded area is relatively large and is greatly beyond the unit (or correctable unit) of an ECC cluster on the optical disc 100, it may be judged that the area is not error correctable. If the incorrectly recorded area is relatively small and is greatly below the unit (or correctable unit) of the ECC cluster on the optical disc 100, it may be judged that the area is error correctable.

As a result of the judgment, if it is judged that the error correction can be performed (the step S307: Yes), after the incorrectly recorded area is registered as the caution area in the file system 113, for example (step S308), the optical pickup 501 is displaced to the recording position before the detrack has occurred, and the recording is restarted (the step S310).

On the other hand, if it is judged the error correction cannot be performed (the step S307: No), after the incorrectly recorded area is registered as the defect area, in the same manner as explained in FIG. 9 (step S309).

Figure 9A:
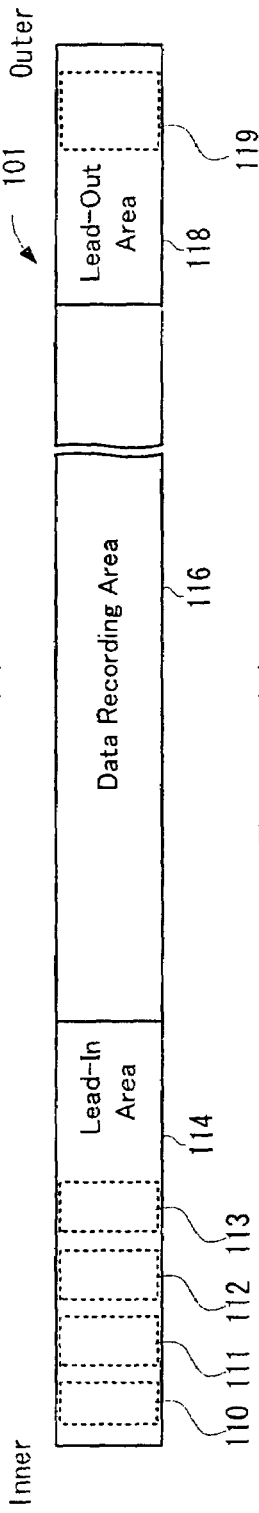
FIG. 9 are data structural views conceptually showing data recorded by one example of the operation after the detrack detection of the information recording apparatus in the example.
Figure 9B:
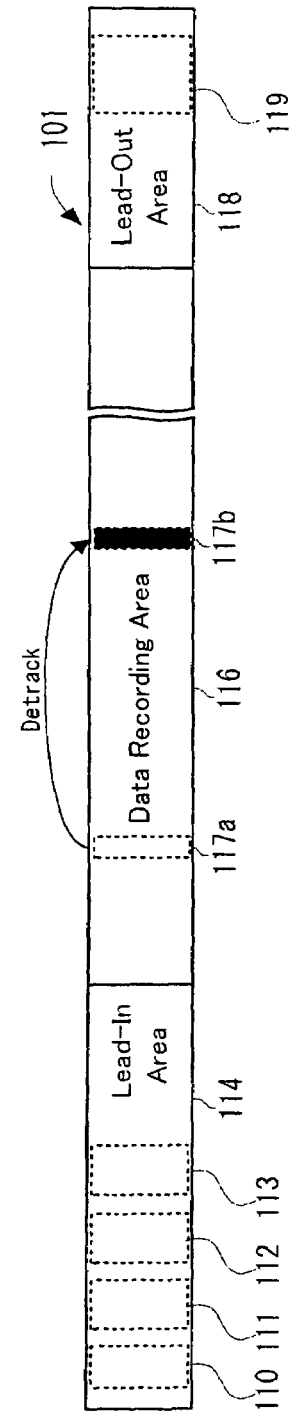
Figure 9C:
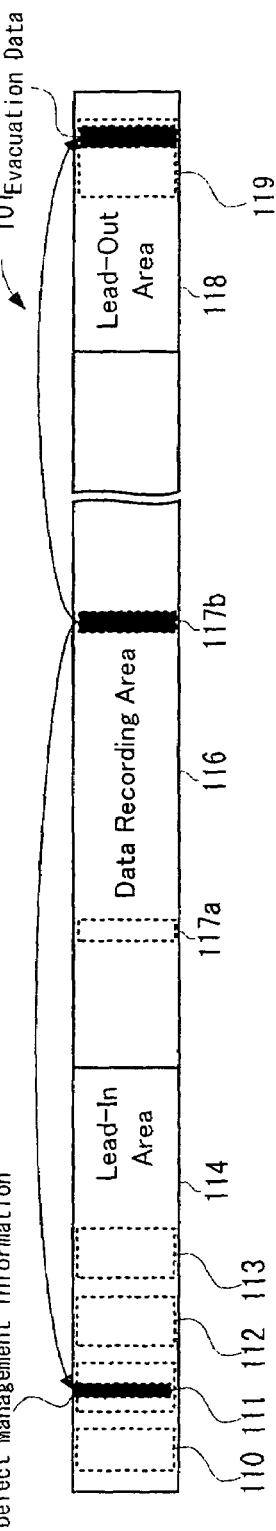

Now, the defect area will be described with reference to FIG. 9. FIG. 9 are data structural views conceptually showing the data structure of an optical disc 101 on which defect management can be performed.

As shown in FIG. 9(*a*), the optical disc 101 is provided with: a lead-in area 114; a data recording area 116; and a lead-out area 118. The lead-in area 114 further has: an OPC area 110; a defect management area 111; and a control information area 112. A file system 113 is recorded in the lead-in area 114.

The OPC area 110 is an area used for the process of detection of the optimum recording laser power (i.e. calibration of the recording laser power). For example, after the test writing of an OPC pattern is completed, the test written OPC pattern is reproduced, and the sampling of the reproduced OPC pattern is performed in order, to thereby detect the optimum recording laser power. Moreover, the value of the optimum recording laser power obtained by the OPC may be recorded.

In the defect management area 111, defect management information which is data for managing a defect which occurs on the optical disc 101 is recorded. In the defect management information, for example, there are recorded a position and a size (or the address thereof) of a defect which occurs in the data recording area 116, and the address value of an evacuation destination of evacuation data, which is the data to be recorded originally or the data recorded at a position where the defect occurs.

The control information area 112 (122) is an area to record therein control information. The control information is information to control recording and reading in the data recording area 116, and it is, for example, information which indicates the attribute and the type of the optical disc 101, information for address management of the data, information for controlling the recording operation and the reading operation of the information recording apparatus 1, such as a disc drive, and the like.

The file system 113 is one specific example of the "management information" of the present invention, in which various management information necessary for the recording operation and the reproduction operation of the optical disc 101 is recorded. For example, it includes the area constituting data of the entire optical disc 101 (e.g. the distribution map of a recorded data recording area and an unrecorded data recording data, etc.), information for specifying an usable area, and the like. Moreover, there is also recorded information which indicates that a special area in the data recording area 116 is the caution area.

Moreover, the lead-out area 118 is provided with a spare area 119. The spare area 119 is an area to which the evacuation data is evacuated. Then, the address value or the like on the spare area 119 of the evacuation data which is evacuated to the spare area 119 is recorded in the above-mentioned defect management information.

Incidentally, the arrangement of these areas shown in FIG. 9 is merely one example and is not limited to this order. Even if each area exists in any place, the recording operation of the information recording apparatus 1 in the example can be performed, obviously.

Then, as shown in FIG. 9(*b*), it is assumed that the detrack occurs in a predetermined area 117*a* on the data recording area 116 and the focus of the optical pickup 501 is displaced (i.e. detracked) to an area 117*b*.

At this time, the detrack detector 550 detects the occurrence of the detrack by the operation from the step S201 to the step S207 in FIG. 6 described above, and registers the area 117*b* as the defect area, as shown in FIG. 9(*c*), by the operation in the step S309 (or the step S306) in FIG. 7.

As shown in FIG. 9(*c*), the defect management information which specifies the address value and the size of the area 117*b* area specified and includes the address value and the size is recorded into the defect management area 111. Moreover, in the case in which there is data which is recorded in the area 117*b* and it is judged that the data cannot be reproduced, for example, if there is such a situation that the data is recorded by the information recording apparatus 1 in a memory or the like, the data may be also recorded into the spare area 119.

Incidentally, as shown in FIG. 10(*a*) and FIG. 10(*b*), the file system 113 may be used to register the caution area as an unusable area or unallocated area. For example, as shown in FIG. 10(*a*), in the case of an optical disc 102 which does not have the defect management area 111 and the spare area 119, the defect area cannot be registered as shown in FIG. 9. Therefore, in this case, as shown in FIG. 10(*b*), if the area is registered as the unusable area or unallocated area in the file system 113, it is possible to prevent the area 117*a* which is incorrectly recorded due to the occurrence of the detrack from being incorrectly reproduced upon the reproduction of the optical disc 102.

On the other hand, if it is judged that the error correction cannot be performed (the step S307: No), the incorrectly recorded area is registered as the defect area, in the same manner as explained in FIG. 9 (the step S309). Incidentally, instead of registering the incorrectly recorded area as the defect area, it may be registered as the unusable area or unallocated area in the file system 113, in the same manner as explained in FIG. 10.

As described above, after the incorrectly recorded area is registered as the defect area in the step S309, the optical pickup 501 is displaced to the recording position before the detrack has occurred, and the recording is restarted again (the step S310).

Then, upon the recording restart operation in the step S310, it may be performed by using the record data buffered in the buffer 505. By this, it is possible to relatively easily specify the data portion at which the recording operation is stopped in the step S301, and it is unnecessary to modulate the record data again through the DVD modulator 506 and the data ECC generator 507. Thus, it is possible to restart the recording operation at higher speed.

Incidentally, in the judgment in the step S304, instead of actually reading the data to judge whether or not it can be reproduced, it may be judged whether or not the data recorded at the detrack destination is incorrectly overwritten with the error-correctable range left, in a similar way to the judgment in the step S307.

Figure 12:
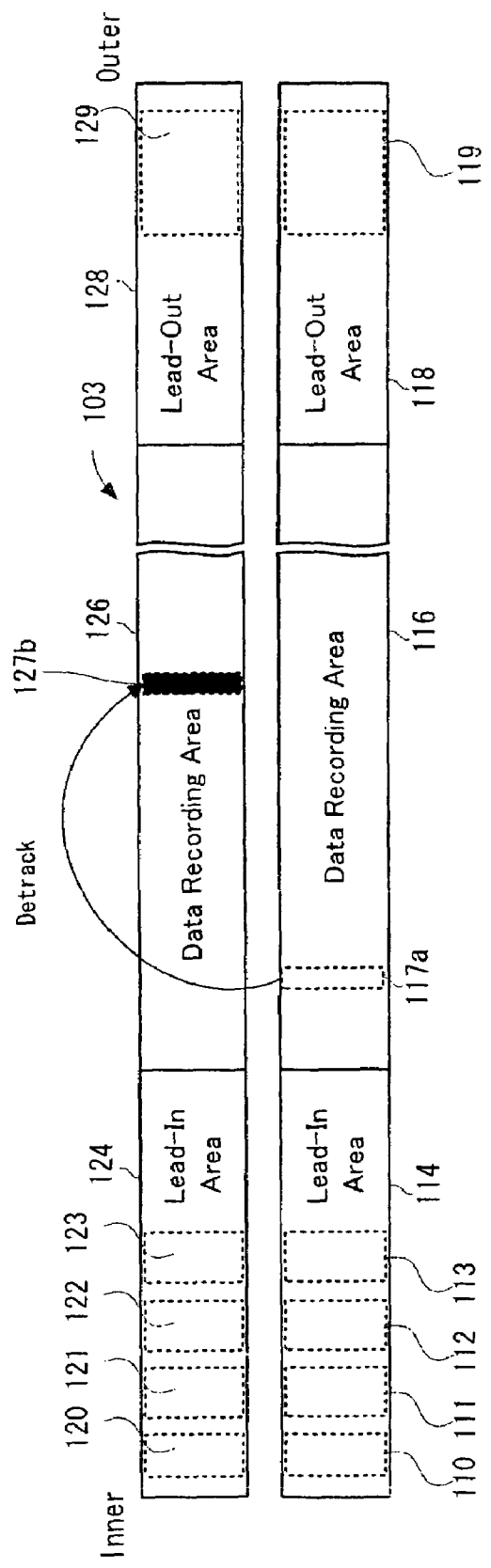
FIG. 12 is a data structural view conceptually showing another procedure of the operation when detrack is detected during the recording in a multilayer optical disc, on the information recording apparatus in the example.

In the explanation of the recording operation in FIG. 7 to FIG. 10, the optical disc having a single recording layer is explained as a main specific example; however, the same operation can be obviously performed with respect to an optical disc having a plurality of recording layers, with no distinction. In addition, if the detrack has occurred which crosses over a plurality of layers (the detrack shown in FIG. 4), the above-mentioned operation may be performed, not only in an incorrectly recorded area in a layer of a detrack destination, but also in an area corresponding to the incorrectly recorded area in another layer out of the plurality of layers. The operation of the information recording apparatus 1 in the optical disc having the plurality of recording layers will be discussed, with reference to FIG. 11 to FIG. 13. FIG. 11 to FIG. 13 are data structural views conceptually showing procedures of the operation when detrack is detected during the recording in a multilayer optical disc of a parallel type.

As shown in FIG. 11, an optical disc 103 having two recording layers is taken as an example for explanation. As shown in FIG. 11, the optical disc 103 has two recording layers, and the recording layer on the lower side in FIG. 11 (hereinafter referred to as a "first layer") is provided with: a lead-in area 114; a data recording area 116; and a lead-out area 118. The lead-in area 114 further has: an OPC area 110; a defect management area 111; and a control information area 112. A file system 113 is recorded in the lead-in area 114. Moreover, the lead-out area 118 is provided with a spare area 119. Furthermore, the recording layer on the upper side in FIG. 11 (hereinafter referred to as a "second layer") is provided with: a lead-in area 124; a data recording area 126; and a lead-out area 128. The lead-in area 124 further has: an OPC area 120; a defect management area 121; and a control information area 122 A file system 123 is recorded in the lead-in area 124. Moreover, the lead-out area 128 is provided with a spare area 129. Then, in the optical disc 103, the optical pickup 501 is located on the first layer side, and the light beam B is irradiated from the first layer side to record and reproduce the data. Moreover, in the second layer, the data is recorded and reproduced by the light beam B transmitted through the first layer.

Then, as shown in FIG. 12, it is assumed that the detrack occurs during the recording in an area 117a in the first layer and that detracking to an area 127b in the second layer is performed. At this time, the information recording apparatus 1 detects the detrack in the above-mentioned various operations, and performs the response operation, as described above (refer to FIG. 6 and FIG. 7).

Then, if the incorrectly recorded area 127b is registered as the defect area, as shown in FIG. 13, the defect management information is recorded into the defect management area 121, and the data recorded in the area 127b (i.e. the evacuation data) is recorded into the spare area 129 if necessary.

In addition, if the second area 127b is incorrectly irradiated with the light beam, it is assumed that an area 117b in the first layer, located between the optical pickup 501 and the area 127b, is also irradiated with the light beam and it is likely influenced somehow. Therefore, in this case, even the area 117b is registered as the defect area, and the defect management information is recorded into the defect management area 111, and if necessary, the data recorded in the area 117b (i.e. the evacuation data) is recorded into the spare area 119.

Here, the area 117b is not limited to an area having the same size (or the same track number) as that of the area 127b. In other words, in the case of the disc-shaped optical disc shown in FIG. 1, for example, due to a difference (i.e. eccentricity) between the center hole 102 in the first layer and the center hole 102 in the second layer, it can be considered that an area in the first area and an area in the second area, which are associated with the same track number, are not linearly arranged along with the light beam B. Therefore, in this case, it is preferable to register not only the area in the first layer having the same track number as that of the area 127b, for example, but also an area in the vicinity thereof, as the defect area, from the view point of reliable recording and reproduction. Moreover, since the light beam B converges to the area 127b from the optical pickup 501, it can be also considered that the first layer is irradiated with the wider light beam B than the area 127b is irradiated. Therefore, even from this viewpoint, it is preferable to register not only the area in the first layer having the same track number as that of the area 127b, for example, but also the area in the vicinity thereof, as the defect area.

Consequently, according to the information recording apparatus in the example, even if the detrack occurs during the recording operation, it is possible to record the data, appropriately, and it is also possible to enable an information reproducing apparatus, such as a DVD player, to appropriately reproduce the data on the optical disc at which the detrack has occurred. By this, there is a great advantage that it is possible to effectively use the optical disc which cannot be used, conventionally, after the occurrence of the detrack.

Moreover, in the above-mentioned example, the optical disc 100 is explained as one example of the information recording medium, and the player related to the optical disc 100 is explained as one example of the information reproducing apparatus. The present invention, however, is not limited to the optical disc and the player thereof, and can be applied to other various information recording media and players thereof that support high-density recording or a high transfer rate. Moreover, according to the above-mentioned example, an explanation is given to the information recording/reproducing apparatus for recording or reproducing information on the multilayer optical disc (FIG. 11 to FIG. 13) of a parallel type in which recording directions are the same in the first layer and the second layer. However, it is obvious that the present invention can be applied to an information recording/reproducing apparatus for recording or reproducing information on a multilayer optical disc of an opposite type in which the recording directions are opposite in the first layer and the second layer.

The present invention is not limited to the above-described example, and various changes may be made, if desired, without departing from the essence or spirit of the invention which can be read from the claims and the entire specification. An information recording apparatus, an information recording method, and a computer program for recording control, all of which involve such changes, are also intended to be within the technical scope of the present invention.

INDUSTRIAL APPLICABILITY

The information recording apparatus, the information recording method, and the computer program according to the present invention can be applied to a recorder or a player associated with a high-density optical disc in which various information can be recorded at high density, for consumer use or for commercial use. Moreover, they can be applied to a recording or reproducing apparatus or the like which is mounted on various computer equipment for consumer use or for commercial use, or which can be connected to various computer equipment.

The invention claimed is:

1. An information recording apparatus comprising:
   a recording device for recording information onto an information recording medium;
   a detrack detecting device for detecting occurrence of detrack during the recording of the information;
   a controlling device for controlling said recording device to return to a location where the detrack has occurred and restart the recording if the occurrence of the detrack is detected;
   a first judging device for judging whether or not the information is already recorded in an area of a detrack destination into which said recording device incorrectly records, in the case in which the occurrence of the detrack is detected by said detrack detecting device;
   a second judging device for judging whether or not the information already recorded in the area of the detrack destination can be reproduced, in the case in which it is judged by said first judging device that the information is already recorded; and
   a third judging device for judging whether or not error correction can be performed with respect to the area of the detrack destination, in the case in which it is judged by said first judging device that the information is unrecorded.

2. The information recording apparatus according to claim 1, wherein
   said information recording apparatus further comprises a buffer of a predetermined size for buffering the information and supplying it to said recording device, and
   said controlling device controls said buffer and said recording device to restart the recording from a location where the recording is to be restarted with using the information stored in said buffer.

3. The information recording apparatus according to claim 2, wherein the predetermined size is equal to or greater than an error-correctable minimum unit.

4. The information recording apparatus according to claim 1, wherein
   said controlling device controls said recording device to return to the location where the detrack has occurred and restart the recording in such a condition that it is judged that the information can be reproduced or that the error correction can be performed.

5. The information recording apparatus according to claim 1, wherein said controlling device controls said recording device to register the area of the detrack destination, as an unallocated area, and to return to the location where the detrack has occurred and to restart the recording if it is judged that the information cannot be reproduced or that the error correction cannot be performed.

6. The information recording apparatus according to claim 1, wherein said controlling device controls said recording device to further register the area of the detrack destination incorrectly recorded, as a caution area if it is judged that the information can be reproduced or that the error correction can be performed.

7. The information recording apparatus according to claim 1, wherein said controlling device controls said recording device to register the caution area as an unallocated area if the area of the detrack destination is the caution area.

8. The information recording apparatus according to claim 1, wherein said controlling device controls said recording device to register an area in another layer corresponding to the area of a detrack destination in one layer incorrectly recorded, as an unallocated area, when the information recording medium is an information recording medium having multiple recording layers.

9. An information recording method comprising:
   a recording process of recording information onto an information recording medium;
   a detrack detecting process of detecting occurrence of detrack during the recording of the information;
   a controlling process of controlling said recording process to return to a location where the detrack has occurred and restart the recording if the occurrence of the detrack is detected;
   a first judging process of judging whether or not the information is already recorded in an area of a detrack destination into which said recording process incorrectly records, in the case in which the occurrence of the detrack is detected by said detrack detecting process;
   a second judging process of judging whether or not the information already recorded in the area of the detrack destination can be reproduced, in the case in which it is judged by said first judging process that the information is already recorded; and
   a third judging process of judging whether or not error correction can be performed with respect to the area of the detrack destination, in the case in which it is judged by said first judging process that the information is unrecorded.

10. A computer-readable medium recording thereon a computer program product for record control and for tangibly embodying a program of instructions executable by a computer provided for an information recording apparatus, said computer program product making the computer function as at least one portion of a recording device, a detrack detecting device, a controlling device, a first judging device, a second judging device and a third judging device,
    said information recording apparatus comprising:
    said recording device for recording information onto an information recording medium;
    said detrack detecting device for detecting occurrence of detrack during the recording of the information;
    said controlling device for controlling said recording device to return to a location where the detrack has occurred and restart the recording if the occurrence of the detrack is detected;
    said first judging device for judging whether or not the information is already recorded in an area of a detrack destination into which said recording device incorrectly records, in the case in which the occurrence of the detrack is detected by said detrack detecting device;
    said second judging device for judging whether or not the information already recorded in the area of the detrack destination can be reproduced, in the case in which it is judged by said first judging device that the information is already recorded; and
    said third judging device for judging whether or not error correction can be performed with respect to the area of the detrack destination, in the case in which it is judged by said first judging device that the information is unrecorded.

* * * * *

UNITED STATES PATENT AND TRADEMARK OFFICE
CERTIFICATE OF CORRECTION

PATENT NO. : 7,577,065 B2  Page 1 of 1
APPLICATION NO. : 10/577773
DATED : August 18, 2009
INVENTOR(S) : Kuroda et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 600 days.

Signed and Sealed this

Seventh Day of September, 2010

David J. Kappos
*Director of the United States Patent and Trademark Office*